(12) United States Patent
Niwa

(10) Patent No.: US 6,749,269 B1
(45) Date of Patent: Jun. 15, 2004

(54) BRAKING SYSTEM HAVING SWITCHING DEVICE FOR SUPPLYING ENERGY TO ELECTRICALLY CONTROLLED THROUGH BRAKE CONTROLLER UPON OPERATION OF BRAKE OPERATING MEMBER

(75) Inventor: Satoru Niwa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/495,447

(22) Filed: Jan. 31, 2000

(30) Foreign Application Priority Data

Feb. 3, 2001 (JP) .......................................... 11-026158

(51) Int. Cl.$^7$ .............................. B60T 13/66; B60T 8/42
(52) U.S. Cl. ...................................... 303/20; 303/115.2
(58) Field of Search ................................ 303/3, 15, 20, 303/115.2, 9.61, 122.03, 122.04, 122.05, 189, 199, 113.4, DIG. 10; 701/70

(56) References Cited

U.S. PATENT DOCUMENTS

| | | | | |
|---|---|---|---|---|
| 3,498,426 A | * | 3/1970 | Nakano | 192/13 R |
| 3,645,352 A | * | 2/1972 | Stark et al. | 180/271 |
| 3,651,457 A | * | 3/1972 | Sprouse | 340/457.3 |
| 3,684,049 A | * | 8/1972 | Kimura | 180/282 |
| 3,792,742 A | * | 2/1974 | Mager | 180/65.5 |
| 4,020,455 A | * | 4/1977 | Irimajiri et al. | 477/203 |
| 4,071,284 A | * | 1/1978 | Masclet et al. | 303/63 |
| 4,561,527 A | * | 12/1985 | Nakamoto et al. | 188/2 D |
| 4,651,071 A | * | 3/1987 | Imanaka | 318/371 |
| 4,655,634 A | * | 4/1987 | Loy et al. | 404/84.05 |
| 4,658,939 A | * | 4/1987 | Kircher et al. | 188/156 |
| 4,679,668 A | * | 7/1987 | Washizu et al. | 188/353 |
| 4,721,344 A | * | 1/1988 | Frait et al. | 303/20 |
| 4,812,777 A | * | 3/1989 | Shirai | 303/14 |
| 5,294,191 A | * | 3/1994 | Giorgetti et al. | 303/3 |
| 5,302,008 A | * | 4/1994 | Miyake et al. | 303/14 |
| 5,418,437 A | * | 5/1995 | Couture et al. | 318/139 |
| 5,462,342 A | * | 10/1995 | Goebels | 303/113.2 |
| 5,466,998 A | * | 11/1995 | Kinoshita et al. | 318/375 |
| 5,519,256 A | * | 5/1996 | Goodridge | 307/10.8 |
| 5,532,674 A | * | 7/1996 | Michaud | 340/479 |
| 5,533,795 A | * | 7/1996 | Brooks | 180/273 |
| 5,588,719 A | | 12/1996 | Bailleux | 303/122.04 |
| 5,785,393 A | * | 7/1998 | McGrath et al. | 303/7 |
| 5,810,454 A | * | 9/1998 | Prinzler et al. | 303/20 |
| 5,829,845 A | * | 11/1998 | Maron et al. | 303/20 |
| 5,862,048 A | * | 1/1999 | Knight | 364/138 |
| 5,902,019 A | * | 5/1999 | Maron et al. | 303/15 |
| 5,957,246 A | * | 9/1999 | Suzuki | 188/72.1 |
| 5,957,551 A | * | 9/1999 | Maron et al. | 303/191 |
| 5,961,190 A | * | 10/1999 | Brandmeier et al. | 303/152 |
| 6,152,545 A | * | 11/2000 | Mauser et al. | 303/20 |
| 6,203,116 B1 | * | 3/2001 | Dieckmann | 303/20 |
| 6,227,626 B1 | * | 5/2001 | Blattert | 303/20 |
| 6,299,261 B1 | | 10/2001 | Weiberle et al. | 303/20 |
| 6,317,675 B1 | * | 11/2001 | Stolzl et al. | 701/76 |
| 6,476,515 B1 | * | 11/2002 | Yamamoto et al. | 307/10.1 |

FOREIGN PATENT DOCUMENTS

| | | | |
|---|---|---|---|
| EP | 0788957 A2 | * | 8/1997 |
| JP | 4243648 A1 | * | 8/1992 |
| JP | 5158742 A | | 6/1993 |
| JP | A-H6-127317 | | 5/1994 |
| JP | A-H10-217936 | | 8/1998 |
| WO | WO-9812090 A1 | * | 3/1998 |

* cited by examiner

Primary Examiner—Melody M. Burch
(74) Attorney, Agent, or Firm—Kenyon & Kenyon

(57) ABSTRACT

The disclosure relates to an electrically controlled braking system including an electrically controlled brake for braking a vehicle wheel, an electric power source device, and a brake control apparatus for controlling an electric energy to be supplied from the electric power source device to the brake, for thereby controlling an operation of the brake, when a brake operating member is operated. A switching device is disposed between the electric power source device and the brake control apparatus. The switching device is turned on for connecting the electric power source device to the brake control apparatus, in response to an operation of the brake operating member.

43 Claims, 9 Drawing Sheets

BRAKING SYSTEM HAVING SWITCHING DEVICE FOR SUPPLYING ENERGY TO ELECTRICALLY CONTROLLED THROUGH BRAKE CONTROLLER UPON OPERATION OF BRAKE OPERATING MEMBER

This application is based on Japanese Patent Application No. 11-26158 filed Feb. 3, 1999, the content of which is incorporated hereinto by reference.

BACKGROUND OF THE INVENTION

1. Field of the Invention

The present invention relates to an electrically controlled braking system including a brake control apparatus which is adapted to control a brake by controlling an electric energy supplied thereto from an electric power source.

2. Discussion of the Related Art

JP-A-5-158742 discloses an example of such an electrically controlled braking system including a brake for braking a wheel of an automotive vehicle, an electric power source, and a brake control apparatus for controlling the brake by controlling an electric energy supplied thereto from the electric power source. The brake is actuated by a pressurized working fluid, and the brake control apparatus includes a solenoid-operated valve device, and a control portion constituted principally by a computer, which is adapted to control an electric energy to be supplied to a solenoid coil of the solenoid-operated valve device so that an operation of the brake is controlled.

In the electrically controlled braking system, an electric power source switch is provided between the electric power source and the solenoid-operated valve device. This electric power source switch is turned from an OFF state to an ON state when an ignition switch of the vehicle is turned on. Therefore, this electrically controlled braking system suffers from a problem that the brake is not activated by an operation of a brake operating member while the ignition switch is off. Accordingly, the braking system is necessarily arranged such that a manually operated brake is activated while the ignition switch is in the off state. This arrangement suffers from another problem that the braking force produced by the brake changes when the ignition switch is turned on or off while the brake operating member is placed in an operated position. If the ignition switch is turned from its ON state to its OFF state while the brake operating member is placed in an operated position, the electrically controlled braking system changes from an operated state to a non-operated state, causing a change in the braking force, which may make the vehicle operator feel uneasy about the braking system. Further, the solenoid-operated valve device may be inoperable in the case of an excessive drop of the output of the single electric power source, or in the event of occurrence of any abnormality of an electric circuit connecting the solenoid-operated valve device and the electric power source.

SUMMARY OF THE INVENTION

It is therefore an object to provide an improved electrically controlled braking system.

This object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. The term "electrically controlled braking system" is interpreted to mean not only a braking system of the type described above, but also a braking system of a type wherein the brake includes an electrically operated actuator adapted to force a friction member onto a rotor so that the wheel rotating with the rotor is braked, while the brake control apparatus includes an actuator control device for controlling the electric energy to be supplied to the electrically operated actuator from the electric power source device, so as to control an operation of the brake.

(1) An electrically controlled braking system including an electrically controlled brake for braking a wheel of an automotive vehicle, an electric power source device, a brake operating member, and a brake control apparatus for controlling an electric energy to be supplied from the electric power source device to the brake, for thereby controlling an operation of the brake, when the brake operating member is operated, and wherein a switching device is disposed between the electric power source device and the brake control apparatus, the switching device being turned on for connecting the electric power source device to the brake control apparatus, in response to an operation of the brake operating member.

In the electrically braking system according to the above mode of this invention, the switching device disposed between the electric power source device and the brake control apparatus is switched from its off state to its on state when the brake operating member is operated, so that the electric power source device is electrically connected to the brake control apparatus, whereby the brake control apparatus is made operable to control the electrically controlled brake. Thus, the electrically controlled braking system does not require a manually operated brake which is adapted to be activated when the brake operating member is operated while an ignition switch provided on the vehicle is off. Further, the braking force produced by the brake will not change even when the ignition switch is turned on while the brake operating member is in operation. In other words, this arrangement prevents an undesirable change in the braking force. The switching device may be considered to be a power source switching device as distinguished from an actuator switching device and a controller switching device which will be described.

The brake control apparatus, which is provided for controlling an operation of the electrically controlled brake, may be adapted to control the amount of an electric energy to be supplied to the brake. When the amount of supply of the electric energy is zero or zeroed, the brake is at rest or de-activated. Alternatively, the brake control apparatus may be adapted to control the duty cycle of an electric actuator (e.g., electric motor) for operating the brake, namely, to alternately turn on and off the electric actuator so as to control a ratio of an ON period during which a predetermined amount of electric energy is supplied to the actuator, to an entire cycle time which is a sum of the ON period and an OFF period during which the electric energy is not supplied to the actuator.

(2) An electrically controlled braking system according to the above mode (1), wherein the electrically controlled brake includes a rotor rotating with the wheel, a friction member, and an electric motor for forcing the friction member onto the rotor, and the brake control apparatus includes a motor control device for controlling the electric energy to be supplied from the electric power source device to the electric motor.

In the braking system according to the above mode (2), which is a preferred form of the invention, an electrically operated actuator in the form of an electric motor is controlled by the brake control apparatus. Therefore, the present braking system is considered to be an electrically operated electrically controlled braking system. Where the electrically controlled brake includes a hydraulically operated actuator rather than an electrically operated actuator, it is comparatively easy to activate a manually operated brake in the event of an electrical failure of the electrically controlled braking system, or to selectively activate the manually operated brake or the electrically controlled brake. Where the electrically controlled braking system is an electrically operated braking system including an electrically operated actuator, it is comparatively difficult to activate the manually operated brake in the event of an electrical failure of the braking system, or selectively activate the manually operated brake or the electrically controlled brake. In this respect, the switching device provided according to the principle of this invention is particularly effective in the electrically operated braking system.

(3) An electrically controlled braking system according to the above mode (1) or (2), wherein the electrically controlled brake includes a rotor rotating with the wheel, a friction member, and an electrically operated actuator for forcing the friction member on to the rotor, the switching device is disposed between the electric power source device and the actuator.

In the braking system according to the above mode (3), the brake control apparatus may include an actuator control device which is adapted to control the electrically operated actuator and connected to the electric power source device such that the actuator control device and the actuator are connected in parallel with each other. In this case, the switching device is disposed between the electric power source device and the parallel connection of the actuator control device and the actuator.

(4) An electrically controlled braking system according to the above mode (1) or (2), wherein the electrically controlled brake includes a rotor rotating with the wheel, a friction member, and an electrically operated actuator for forcing the friction member onto the rotor, the braking system further comprising another switching device disposed between the electric power source device and the actuator, the another switching device being turned on to connect the electric power source device to the actuator in response to an operation of the brake operating member.

(5) An electrically controlled braking system according to any one of the above modes (1)–(4), wherein the switching device includes a plurality of switches connected in series with each other.

In the braking system according to the above mode (5) wherein the switching device includes two or more switches connected in series with each other, the switching device can be turned off as long as at least one of the switches can be turned off, even if some of the switches cannot be turned off for some reason or other. This arrangement makes it possible to prevent a problem that the electric energy is kept supplied to the brake control apparatus or the electrically operated actuator provided in the above mode (3) or (4).

The above arrangement is equally applicable to not only the switching device which is adapted to be turned off in response to an operation of the brake operating member, such as the switching device in the above modes (1) and (3) disposed between the electric power source device and the brake control apparatus, and the switching device in the above mode (4) disposed between the electric power source device and the electrically operated actuator, but also to other switching devices such as a switching device which is adapted to be turned off in response to an operation of an ignition switch provided on the vehicle, a plurality of actuator switching devices provided for respective electrically operated actuators such as electric motors, and a controller switching device which is turned on or off depending upon whether the brake control device is normal or abnormal.

(6) An electrically controlled braking system according to any one of the above modes (1)–(5), wherein the brake control apparatus includes a plurality of control devices each of which is principally constituted by a computer, and the electric power source device includes a plurality of electric power sources corresponding to the plurality of control devices, respectively.

In the braking system according to the above mode (6) wherein a plurality of sets of control devices and electric power sources are provided, the operation of the electrically controlled brake can be controlled by at least one of the control devices which is normally operable, as long as the corresponding at least one of the electric power sources is normal, even if the other electric power source or sources is/are abnormal.

(7) An electrically controlled braking system according to the above mode (6), wherein the plurality of control devices are substantially identical with each other.

The plurality of control devices are considered to be substantially identical with each other, if control commands generated by the plurality of control devices permit the electric energy to be controlled so as to establish substantially identical operating conditions of the electrically controlled brake. In other words, the control devices which are substantially identical with each other generate substantially identical control commands. Described more specifically, substantially identical operating conditions of the brake can be established if control commands generated by the respective control devices on the basis of the same input data are substantially identical with each other. That is, the control devices are substantially identical with each other where stored control programs executed by the respective control devices are identical with each other, or where the control devices employ the same hardware circuits. The control commands generated by the respective control devices may be substantially identical with each other even where the input data received by the control devices are more or less different from each other. Further, control commands generated by some of the control devices on the basis of a relatively large number of input data items may be substantially identical with control commands generated by the other control devices on the basis of a relatively smaller number of input data items, so that the operating condition of the brake as controlled by the above-indicated some of the control devices does not greatly differ from the operating condition as controlled by the other control devices. The control commands based on the relatively large number of input data items permit an intricate or fine control of the brake, while the control commands based on the relatively small number of input data items permits only a rough or coarse control of the brake.

(8) An electrically controlled braking system according to the above mode (6) or (7), wherein the brake control apparatus (18) includes a control on/off device for continuing a control of the electrically controlled braking system when predetermined at least one of the plurality of control devices is normal, and stopping the control of the electrically controlled braking system when the predetermined at least one of the plurality control devices is not normal.

In the braking system wherein the brake control apparatus includes a plurality of control devices, the operating condition of the electrically controlled brake can be continuously controlled even if some of the control devices are abnormal, as long as at least one of the control devices is normally functioning. When the predetermined at least one of the control devices is not normal, it is desired or required that the control of the brake be terminated. The predetermined at least one control device may be simply a predetermined one or a predetermined number of the normally functioning control devices, which may or may not be interchangeable with each other. If all of the mutually interchangeable control devices are abnormal, the control of the brake cannot be continued. If only one of the mutually interchangeable control devices is normal, on the other hand, it may be better not to stop or terminate the control of the brake. Although the control of the brake is possible as long as at least one of the control devices is normal, it may be better to stop the control from the standpoint of fail-safe protection of the braking system.

The control on/off device provided according to the above mode (7) may include a switch control device for turning off the switching device provided in the above modes (1) and (3) or the switching device provided in the above mode (4). In this case, the supply of the electric energy to the brake control apparatus or the electrically operated actuator is terminated by the switch control device of the control on/off device, to stop the operation of the braking system.

The control on/off device indicated above may be provided in the braking system according to a mode (24) described below wherein a controller switching device is provided between the electric power source device and the electrically operated actuator or the brake control apparatus such that the controller switching device and the power source switching device are connected in parallel with each other. In this case, the control on/off device may include a switch control device for holding the controller switching device in an on state when the predetermined at least one of the control devices is normal, and turning off the controller switching device when the predetermined at least one of the control devices is not normal.

(9) An electrically controlled braking system according to any one of the above modes (6)–(8), wherein the brake control apparatus includes an abnormality detecting device for detecting that at least one of the plurality of control devices is abnormal.

The abnormality detecting device may include a computer which is separate from the control devices described above with respect to the above modes (6)–(8), or may include at least one of those control devices. In the latter case, each of the control devices may have a mutually monitoring function, that is, may be adapted to check if any of the other control devices is abnormal. In this case, the abnormality detecting device may be provided without having to increase the required number of computers provided in the braking system.

Where the control devices are substantially identical with each other, the control commands generated by these control devices must be substantially identical with each other. In this case, the abnormality detecting device may be adapted to determine that the control devices are all normal, if the control commands generated by all of the control devices are substantially identical with each other, and determine that at least one of the control devices is abnormal, if the control commands are largely different from each other. The abnormality detecting device may be adapted to determine that if the control command or commands generated by at least one of the control devices is outside an optimum range, the at least one control device is abnormal. Where the control devices receive output signals of the same detectors as the input data on which the control commands are generated, the abnormality detecting device may use the input data to determine if each control device is normal or not. Where the control devices are different from each other, the abnormality detecting device may be adapted to determine if each control device is normal or not, depending upon whether the control commands generated by the control devices maintain a predetermined relationship.

Where the brake control apparatus includes at least three control devices, the diagnosis for abnormality of the control devices may be effected by decision by majority, or by comparing two or more sets of two output commands generated by the two control devices. Where the brake control apparatus includes two control devices, it may be difficult to check the control devices for abnormality, for instance, in the case where the control commands generated by the two control devices are both within an optimum range but are considerably different from each other. In this case, the brake control apparatus may include a primary control device and an auxiliary control device, so that the abnormality detecting device determines that the auxiliary control device is abnormal if the control commands generated by the primary and auxiliary control devices are considerably different from each other.

(10) An electrically controlled braking system according to the above mode (9), wherein each of the plurality of control devices includes a plurality of central processing units, and the abnormality detecting device includes a CPU abnormality detecting device for detecting that at least one of the plurality of central processing units is abnormal.

In the braking system according to the above mode (10), the CPU abnormality detecting device is adapted to detect that at least one of the central processing units included in one control device is abnormal. The CPU abnormality detecting device may include the central processing units. That is, the central processing units may serve as a part of the CPU abnormality detecting device. Alternatively, the CPU abnormality detecting device may include a computer separate from the central processing units. Where each control device includes two central processing units, these two units consist of a primary central processing unit and an auxiliary central processing unit.

Where the brake control apparatus includes "n" number of control devices each of which includes "m" number of central processing units, the brake control apparatus includes a total of "n"בm" number of central processing units. Each of these "n"בm" number of central processing units may have a mutually monitoring function so that these central processing units can be checked for abnormality, on the basis of results of their mutual monitoring functions. These results may be treated equally or given suitable different weights in determining the presence of abnormality of any one of the central processing units. The results of the mutually monitoring functions of all or selected combinations of the two central processing units may be used.

(11) An electrically controlled braking system according to any one of the above modes (1)–(5), wherein the brake control apparatus includes at least three control devices each of which is principally constituted by a computer.

In the braking system according to the above mode (11), all of the at least three control devices need not be connected to respective electric power sources. Namely, at least two of the at least three control devices may be connected to a single common electric power source. The present braking system may have any one of the technical features of the above modes (7)–(11).

(12) An electrically controlled braking system according to any one of the above modes (1)–(5), wherein the brake control apparatus includes at least one control device each of which is principally constituted by a computer, and the electric power source device includes a plurality of electric power sources which are arranged to supply electric energies to each of the at least one control device independently of each other.

Where a plurality of electric power sources are provided for a single control device, the control device is operable to control the operation of the electrically controlled brake, as long as at least one of the electric power sources is normal. The electric energies can be supplied from the plurality of electric power sources to the same control device, where the plurality of electric power sources are connected to the control device such that the electric power sources are connected in parallel with each other. The following mode (13) of the invention is one typical example of the above mode (12):

(13) An electrically controlled braking system according to any one of the above modes (1)–(12), wherein the electrically controlled brake includes a front brake for braking a front wheel and a rear brake for braking a rear wheel, and the brake control apparatus includes a front brake control device for controlling an operation of the front brake and a rear brake control device for controlling the rear brake, the electric power source device includes a plurality of electric power sources which are arranged to supply electric energies to the front brake control device independently of each other.

In the braking system according to the above mode (13), the electric energies are supplied from the two or more electric power sources to the front brake control device, so that the front brake control device is operable to control the operation of the front brake as long as at least one of the electric power sources is normal, even in the event of occurrence of an excessive output drop or other abnormality of at least one of the electric power sources.

For braking an automotive vehicle, the front wheel brake is more important than the rear wheel brake. In this sense, the above arrangement for supplying the electric energies from the two or more electric power sources to the front brake control device independently of each other is more effective than an arrangement for supplying the electric energies from the electric power sources to the rear brake control device.

The above form (13) of the invention is applicable to a braking system wherein the electrically controlled brake includes an electrically operated actuator, while the brake control apparatus includes an actuator control device for controlling the electric energy to be supplied to the actuator, as described above with the above form (3), and further includes a main control device for suppling the actuator control device with a control command indicative of the desired amount of electric energy to be supplied to the actuator or the desired braking force to be generated by the brake. In this case, the front brake control device and the rear brake control device may be included in either the main control device or the actuator control device.

(14) An electrically controlled braking system according to the above mode (13), wherein the rear brake includes a first rear brake and a second rear brake, and the rear brake control device includes a first rear brake control device for controlling the first rear brake and a second rear brake control device for controlling the second rear brake, the first rear brake control device being connected to one of the plurality of electric power sources while the second rear brake control device being connected to another of the plurality of electric power sources.

The first and second rear brake control devices indicated above are connected to the respective different electric power sources. These two electric power sources are two of the electric power sources which are arranged to supply the electric energies to the front brake control device independently of each other as described above with respect to the above mode (13).

(15) An electrically controlled braking system according to any one of the above modes (1)–(11), wherein the electrically controlled brake includes a front left brake for braking a front left wheel a front right brake for braking a front right wheel, a rear left brake for braking a rear left wheel and a rear right brake for braking a rear right brake, and the brake control apparatus includes a front left brake control device for controlling the front left brake, a front right brake control device for controlling the front right brake, a rear left brake control device for controlling the rear left brake and a rear right brake control device for controlling the rear right brake, the electric power source device including a front left brake power source and a front right brake power source which are arranged to supply electric energies to the front left and right brake control devices, respectively, independently of each other, and a common rear brake power source arranged to supply an electric energy to both of the rear left and right control devices.

(16) An electrically controlled braking system according to any one of the above modes (1)–(15), wherein the electrically controlled brake includes a rotor rotating with a front wheel, a friction member, and an electrically operated front brake actuator for forcing the friction member onto the friction member, and the electric power source device includes a plurality of electric power sources arranged to supply electric energies to the front brake actuator independently of each other.

In the braking system according to the above mode (16), the two or more electric power sources are provided for the front brake actuator, so that the front brake actuator is operable to control the brake for the front wheel, as long as at least one of the electric power sources is normal.

The relationship between the control devices and the electric power source device, which has been described above with respect to each of the above modes (12)–(15), is applicable to the relationship between the electrically operated actuator and the electric power source device. Examples of this application will be described with respect to the following modes (17) and (18) of the invention:

(17) An electrically controlled braking system according to the above mode (16), wherein the electrically controlled brake further two electrically operated rear brake actuators each of which is arranged to force a friction member onto a rotor rotating with a corresponding one of rear left and right wheels, and the electric power source device includes two electric power sources provided for the two rear brake actuators, respectively.

In the braking system according to the above mode (17), one electric power source is provided for each of the two rear brake actuators. The plurality of electric power sources provided for the front brake actuator may serve as these two electric power sources for the rear brake actuators. Alternatively, these two electric power sources for the rear brake actuators may be power sources different or separate from the power sources for the front brake actuator.

(18) An electrically controlled braking system according to any one of the above modes (1)–(17), wherein the electrically controlled brake includes an electrically operated front brake actuator for forcing a friction member onto a rotor rotating with a front wheel, and an electrically operated rear brake actuator for forcing a friction member onto a rotor rotating with a rear wheel, and the electric power source device includes a front brake power source for supplying an electric energy to the front brake actuator and a rear brake power source for supplying an electric energy to the rear brake actuator.

In the braking system according to the above mode (18), different electric power sources are provided for supplying electric energies to the front brake actuator and the rear brake actuator, respectively. This arrangement considerably reduces a risk that the front and rear brake actuators are both inoperable.

(19) An electrically controlled braking system according to any one of the above modes (1)–(18), wherein the electrically controlled brake includes a plurality of brakes for braking respective wheels of the automotive vehicle, the brakes including respective electrically operated electric motors each of which is arranged to force a friction member onto a rotor rotating with a corresponding one of the wheels, the braking system further comprising a plurality of actuator switching devices each of which is disposed between the electric power source device and a corresponding one of the electric motors, each of the actuator switching devices being operable between a connecting state for connecting the electric power source device to the corresponding electric motor, and a disconnecting state for disconnecting the electric power source device from the corresponding electric motor.

In the braking system according to the above mode (19) wherein the actuator switching devices are provided for the respective electric motors, each of the electric motors can be connected and disconnected to and from the electric power source device. For example, each actuator switching device may be adapted to be brought into its disconnecting state when the corresponding electric motor becomes abnormal. In this case, the actuator switching devices corresponding to the normal electric motors are held in the connecting state to hold the normal electric motors operable, while only the abnormal electric motor is held at rest, so that the brakes corresponding to the normal electric motors can be activated or held in operation. Thus, an occurrence of abnormality of some of the electric motors will not cause all of the electric motors to be inoperable. The actuator switching devices may be adapted to be switched to the disconnecting state when the corresponding motor control devices or motor driver circuits become abnormal. The motor control devices, which are part of the brake control apparatus, are arranged to control the electric energies to be supplied to the respective electric motors.

Where the plurality of electric motors are connected to the electric power source device such that the electric motors are connected in parallel with each other, the actuator switching devices are provided in respective circuits corresponding to the electric motors.

(20) An electrically controlled braking system according to the above mode (19), wherein the brake control apparatus includes motor control devices for controlling the electric motors, respectively, and each of the plurality of actuator switching devices includes two switches connected in series with each other, one of the two switches of the each actuator switching devices being turned off when the corresponding electric motor becomes abnormal, the other of the two switches being turned of f when the corresponding motor control device becomes abnormal.

In the braking system according to the above mode (20), each actuator switching device is placed in its disconnecting state when at least one of the corresponding electric motor and motor control device becomes abnormal or defective.

(21) An electrically controlled braking system according to any one of the above modes (1)–(20), wherein the electrically controlled brake includes a rotor rotating with the wheel, a friction member, and an electrically operated actuator for forcing the friction member onto the rotor, and the brake control apparatus includes a main control device which determines a physical quantity relating to a desired value of a braking force to be produced by the brake and generates a control command representative of the determined physical quantity, and an actuator control device which controls the electrically operated actuator according to the control command and generates a signal representative of a physical quantity relating to an actual value of the braking force produced by the brake.

In the braking system according to the above mode (21), data communication is effected between the main control device and the actuator control device, so that the control command representative of the desired braking force is fed from the main control device to the actuator control device, while the signal representative of the actual braking force is fed from the actuator control device to the main control device. The physical quantity relating to the desired braking force may be the desired value of the braking force per se, or an amount of electric current to be supplied to the actuator so as to permit the brake to produce the desired braking force. The physical quantity relating to the actual braking force may be the actual value of the produced braking force, a force by which the friction member is forced onto the rotor, or a physical quantity representing a load acting on the actuator ((e.g., an electric current flowing through the actuator).

(22) An electrically controlled braking system according to the above mode (21), wherein the actuator control device is spaced from the main control device and disposed on a sprung member of the automotive vehicle such that the actuator control device is located near the actuator, the main control device and the actuator control device have means for data communication therebetween through a local area network (LAN).

If the main control device and the actuator control device are arranged integrally with each other, the data communication between these devices can be effected with high efficiency and reliability. However, the integral arrangement requires an increased memory capacity and an increased number of input and output ports, resulting in an increase in the overall cost of manufacture of the brake control apparatus.

Where the main control device and the actuator control device are separate and spaced from each other, a comparatively long time is required for the data communication between these control devices, leading to a delay in controlling the electrically controlled brake. It is also noted that the electrically operated actuator and the actuator control device are desirably arranged integrally with each other, since the actuator is controlled by control commands received from the actuator control device. The actuator is disposed on an unsprung member of the vehicle. If the actuator control device is also disposed on the unsprung member with the actuator, the actuator control device is undesirably subject to vibrations of a relatively large amplitude. In view of the above, the braking system according to the above mode (22) is arranged such that the actuator control device is disposed on a sprung member of the automotive vehicle and is located near the actuator, and such that the data communication between the main control device and the actuator control device is effected through a local area network (LAN), so-called "car area network: CAN". The data communication through the CAN permits efficient multiple communication, that is, transmission and reception of large volume of information in a short time, between the main control device and the actuator control device, without a control delay. Since these two control devices are both disposed on the sprung members of the vehicle, they are less likely to be influenced by noises, and are protected from large-amplitude vibrations.

(23) An electrically controlled braking system according to the above mode (21) or (22), wherein the main control device includes an abnormality detecting device for detecting an abnormality of the actuator control device, on the basis of the signal representative of the physical quantity relating to the actual value of the braking force produced by the brake.

If the physical quantity relating to the actual braking force is outside a predetermined range, the actuator control device which generated the signal representative of this physical value is considered to be abnormal. The abnormality detecting device may be adapted to detect an abnormality of the actuator control device, on the basis of the physical quantity relating to the desired braking force determined by the main control device, as well as the physical quantity relating to the actual braking force. Namely, the abnormality detecting device may be adapted to determine that the actuator control device is abnormal, if the difference between those two physical quantities exceeds a predetermined value. The abnormality detecting device is particularly effective where it is provided together with the actuator switching device which has been described above with respect to the above modes (19) and (20).

(24) An electrically controlled braking system according to any one of the above modes (1)–(23), wherein the electrically controlled brake includes a rotor rotating with the wheel, a friction member, and an electrically operated actuator for forcing the friction member onto the rotor, the braking system comprising an electric circuit in which the actuator and the brake control apparatus are connected to the electric power source device such that the actuator and the brake control apparatus are connected in parallel with each other, and wherein the switching device is disposed in a common portion of the electric circuit which serves to connect the electric power source device to both of the actuator and the brake control apparatus.

(25) An electrically controlled braking system according to the above mode (24), further comprising a controller switching device which is turned off to disconnect the brake control apparatus from the electric power source device when the brake control apparatus is abnormal, the controller switching device being disposed in an exclusive portion of the electric circuit which serves to connect the electric power source device to only the actuator.

In the braking system according to the above mode (25), the electric power source device, the power source switching device, the controller switching device and the electrically operated actuator are connected in series with each other. Even when the power source switching device is in the on state, an electric energy is not supplied to the actuator if the controller switching device is in the of f state.

Where the electrically controlled brake includes a plurality of electrically operated actuators, a group of these actuators and the brake control apparatus are connected to the electric power source device such that the group of actuators and the brake control apparatus are connected in parallel with each other, and the actuators are connected in parallel with each other through respective parts of the above-indicated exclusive portion of the electric circuit which serves to connect the electric power source device to the group of actuators. In this case, the controller switching device for each actuator is disposed at a position in the above-indicated exclusive portion of the electric circuit, which is between the electric power source device and the end of each of the above-indicated respective parts, which end is remote from the corresponding actuator. The actuator switching device for each actuator is disposed in the corresponding one of the above-indicated parts of the electric circuit through which the actuators are connected in parallel with each other.

(26) An electrically controlled braking system according to the above mode (25), wherein the controller switching device includes a plurality of switches connected in parallel with each other, and the brake control apparatus includes a plurality of control devices which are principally constituted by respective computers and which correspond to the plurality of switches, respectively, and a switch control device for turning off one of the plurality of switches of the controller switching device when one of the control devices which corresponds to the one of the plurality of switches becomes abnormal.

Where the controller switching device includes two switches and the brake control apparatus includes two control devices, one of the two switches is turned off by the switch control device when one of the control devices which corresponds to the above-indicated one switch becomes abnormal. The controller switching device is held in the on state as long as at least one of the control devices is normal, and is brought into the off state when all of the control devices are abnormal.

(27) An electrically controlled braking system according to any one of the above modes (24)–(26), wherein the electric power source device includes a plurality of electric power sources, and the switching device includes a main switch provided in the common portion of the electric circuit which includes one of the electric power sources, a plurality of coils which are energized and de-energized to turn on and of f the main switch, a plurality of coil connecting circuits for connecting the plurality of coils to the plurality of electric power sources, and a plurality of brake switches which are respectively provided in the coil connecting circuits and which are turned on when the brake operating member is operated.

In the braking system according to the above mode (27), the main switch of the switching device is turned on to connect the electric power source device to said brake control apparatus when at least one of the plurality of coils is energized. The coils are connected to the respective electric power sources. Accordingly, the main switch can be turned on as long as at least one of the electric power sources is normal. Thus, the present arrangement reduces a probability that the main switch cannot be turned on.

(28) An electrically controlled braking system according to any one of the above modes (24)–(26), wherein the electric power source device includes a plurality of electric power sources, and the electrically controlled brake includes a plurality of electrically operated actuators, the brake control apparatus including a plurality of actuator control devices for controlling the plurality of actuators, respectively, the braking system comprising a plurality of electric circuits each of which includes a corresponding one of the electric power sources, a corresponding one of the actuators and a corresponding one of the actuator control devices, the switching device including a main switch provided in each of the plurality of electric circuits, a coil which is energized and de-energized to turn on and off the main switch, a coil connecting circuit for connecting the coil to the corresponding one of the electric power sources, and a brake switch which is provided in the coil connecting circuit and which is turned on when the brake operating member is operated.

The braking system according to the above mode (28) has a plurality of electric circuits including respective electric power sources. In the event of an excessive output drop or other abnormality of one of the electric power sources, the corresponding main switch is not turned on even when the brake operating member is operated. In this event, however, the main switch or switches corresponding to the normal electric power source or sources can be turned on when the brake operating member is operated.

(29) An electrically controlled brake system according to any one of the above modes (1)–(28), further including an mechanically operated brake mechanically operated by the brake operating member, and wherein the brake control apparatus includes a switching mechanism operable between a connecting state in which an operating force-applied to the brake operating member upon operation of the brake operating member is transmitted to the mechanically operated brake and a disconnecting state in which the operating force is not transmitted to the mechanically operated brake, the brake control apparatus further including a switching control device which is normally placed in the disconnecting state, and is brought into the connecting state when an electrical abnormality of the electrically braking system takes place.

In the braking system according to the above mode (29), the mechanically operated brake is not activated upon operation of the brake operating member, while the switching mechanism is placed in the disconnecting state. When the brake operating member is operated while the switching mechanism is placed in the connecting state, the mechanically operated brake is activated to brake the vehicle wheel. The switching control device may be adapted to bring the switching mechanism into the connecting state when the electric power source device or the brake control apparatus becomes abnormal, for example. According to this arrangement, the mechanically operated brake can be activated by operation of the brake operating member even while the braking system is electrically abnormal.

The technical feature of the above mode (29) is available independently of the technical feature of any one of the above modes (1)–(28).

(30) An electrically controlled braking system for braking a front wheel and a rear wheel of an automotive vehicle, comprising: a front wheel brake (10, 12) including a rotor rotating with said front wheel, a friction member, and an electrically operated actuator for forcing the friction member onto the rotor, for thereby braking the front wheel; a plurality of electric power sources arranged to supply electric energies to the front wheel brake independently of each other; and a brake control device for controlling the electric energy to be supplied from at least one of the electric power sources to the electrically operated actuator of the front wheel brake, to thereby control an operation of the front wheel brake.

(31) An electrically controlled braking system for braking a plurality of wheels of an automotive vehicle, by operations of respective electrically operated actuators, wherein an actuator switching device is provided between each of the electrically operated actuators and one electric power source for driving each actuator, such that the actuator switching device is operable between a connecting state for connecting each actuator and the electric power source to each other, and a disconnecting state for disconnecting each actuator and the electric power source from each other.

BRIEF DESCRIPTION OF THE DRAWINGS

The above and optional objects, features, advantages and technical and industrial significance of this invention will be better understood and appreciated by reading the following detailed description of presently preferred embodiments of the invention, when considered in connection with the accompanying drawings, in which.

DETAILED DESCRIPTION OF THE PREFERRED EMBODIMENTS

Figure 1:
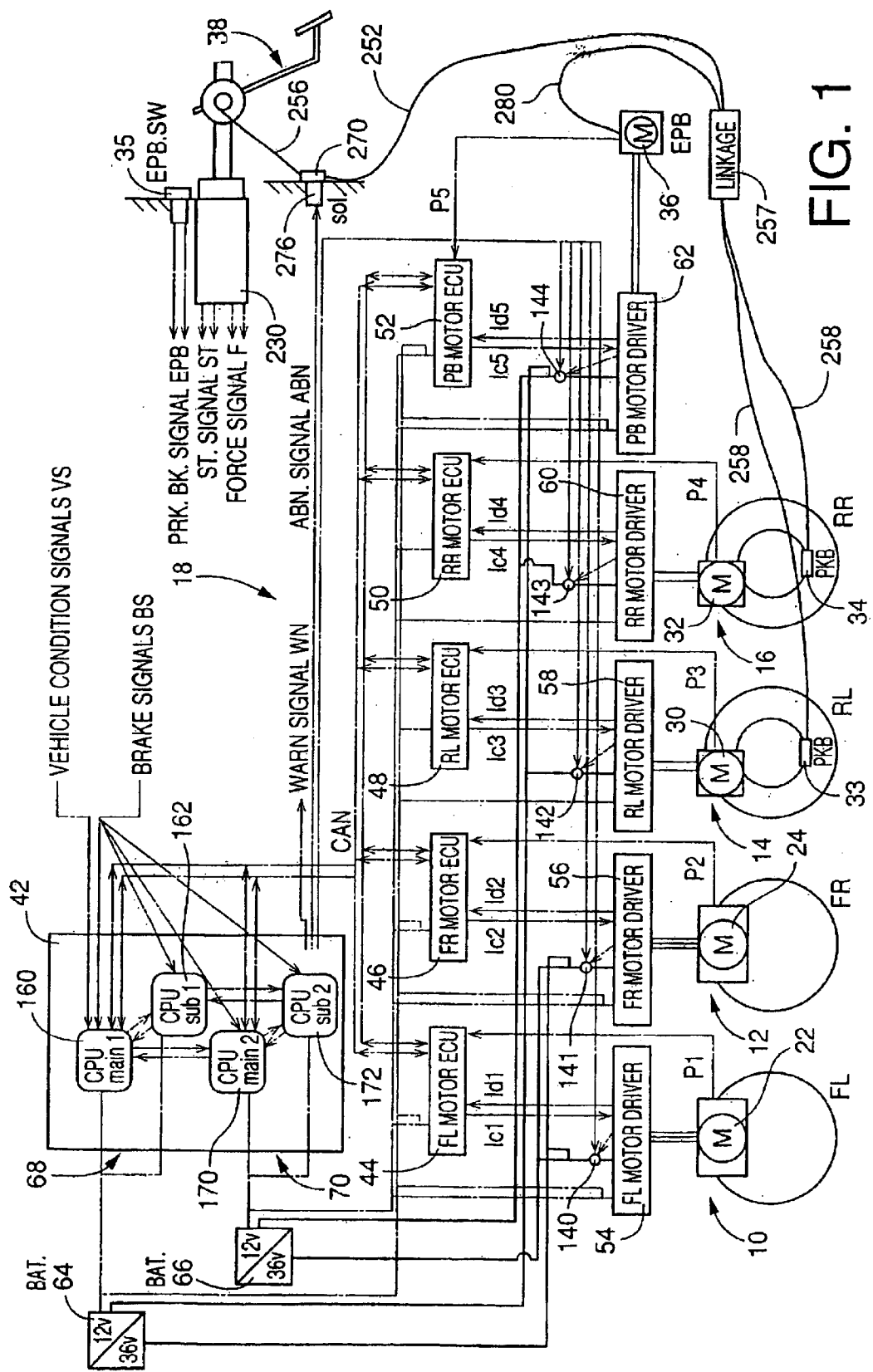
FIG. 1 is a schematic view showing an electrically controlled braking system constructed according to one embodiment of this invention.
Figure 2:
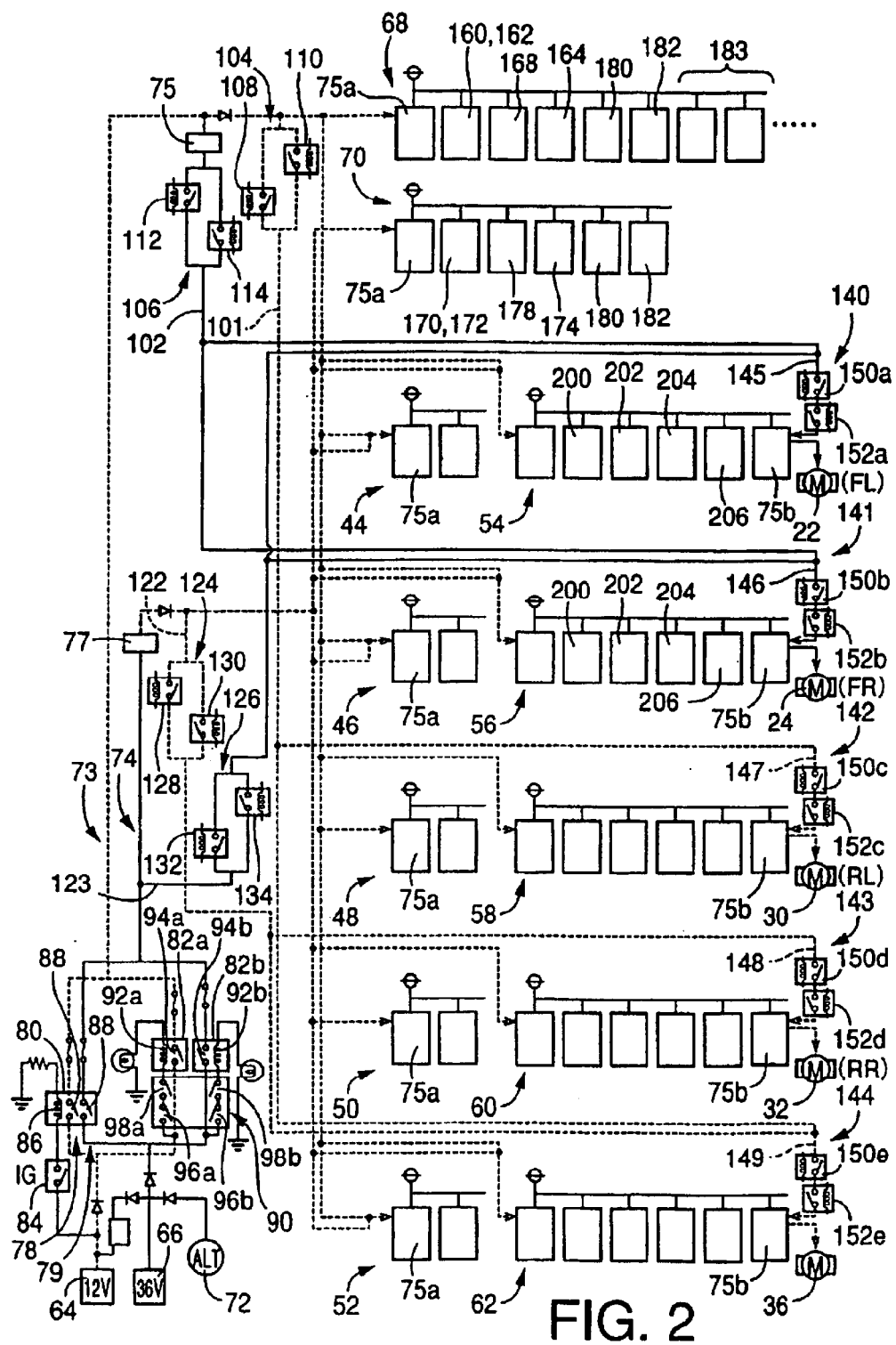
FIG. 2 is a diagram showing an electrical circuitry of the electrically controlled braking system of FIG. 1.
Figure 3:
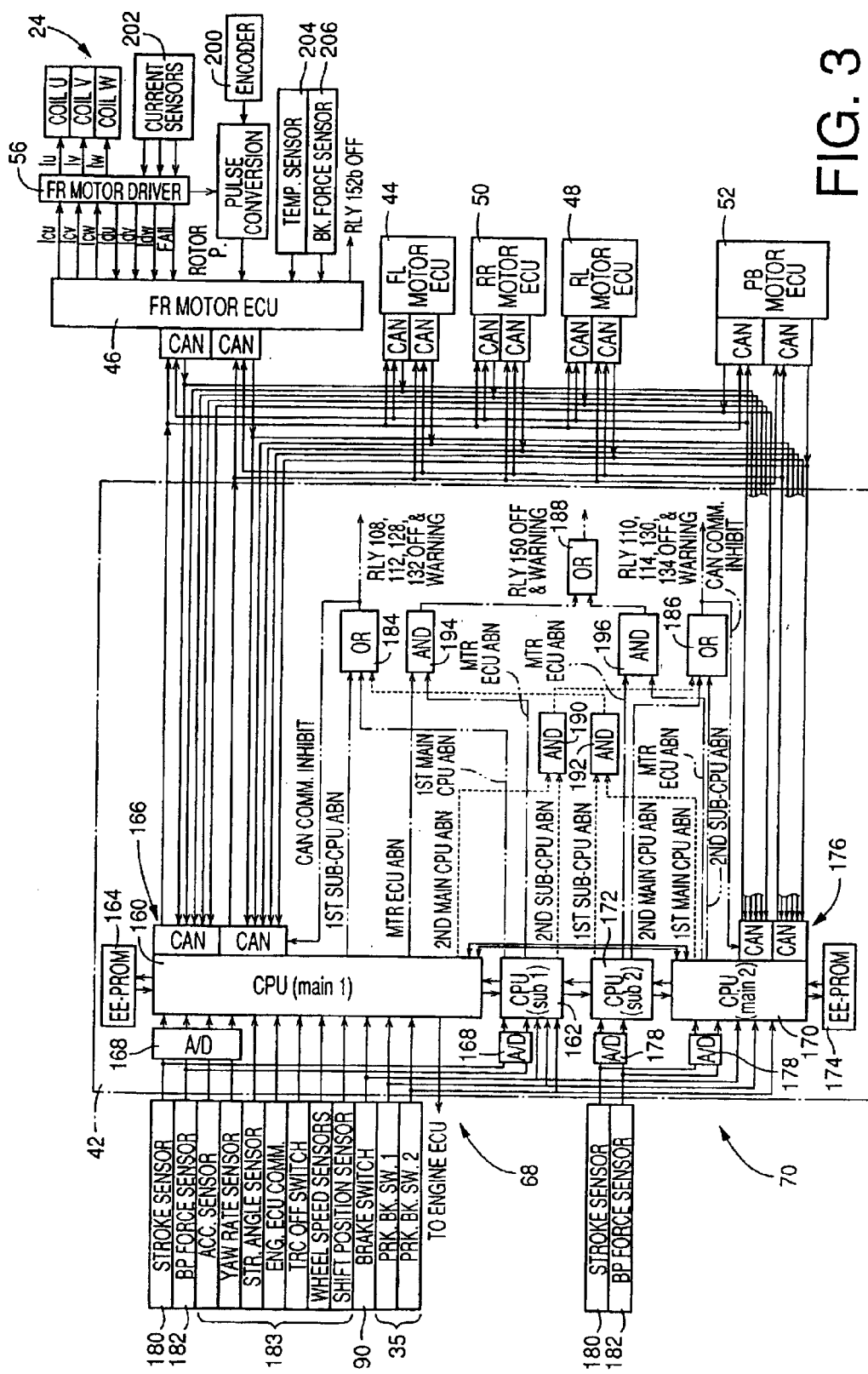
FIG. 3 is a block diagram showing a control apparatus of the braking system of FIG. 1.
Figure 11:
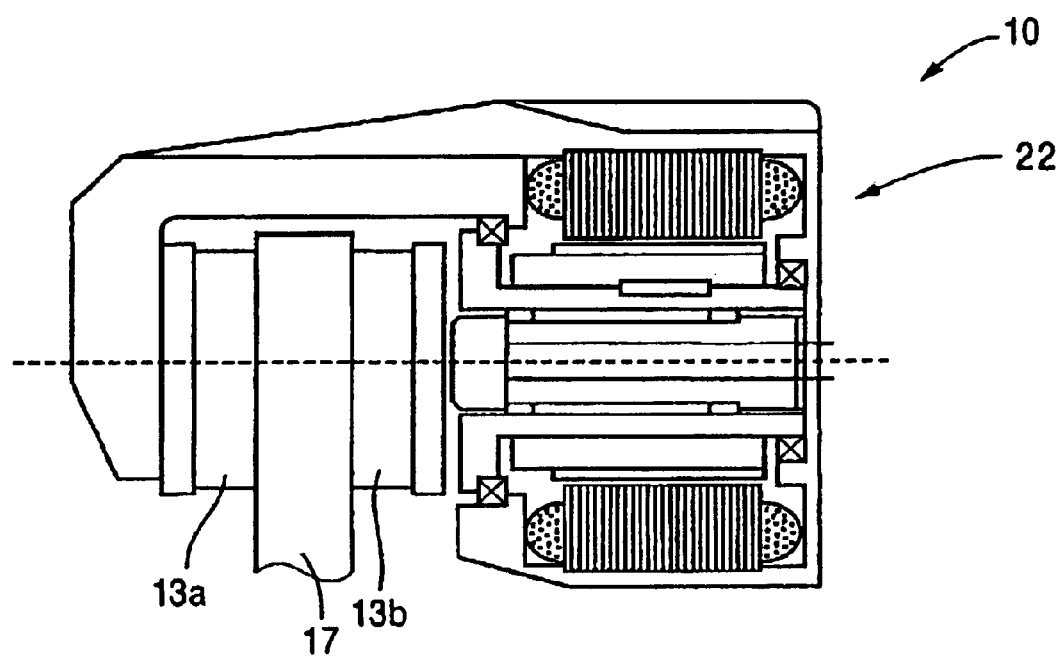
FIG. 11 is a view of a part of a brake which is included in the braking system of FIG. 1.

Referring to FIGS. 1–3, the electrically controlled braking system shown therein has four electrically controlled brakes 10, 12, 14, 16 for respective front left and right wheels FL, FR and rear left and right wheels RL, RR, and a brake control apparatus 18 for controlling of these brakes 10, 12, 14, 16. The brakes 10 and 12 for the front wheels FL, FR are disc brakes including respective electric motors 22, 24. Each of the disc brakes 10, 12 has friction pads 13a, 13b which are forced onto a brake disc 17, as shown in FIG. 11, so that the corresponding front wheel FL, FR rotating with the brake disc is braked. The brakes 14, 16 are drum brakes including respective electric motors 30, 32. Each of the drum brakes 14, 16 has brake linings which are forced onto a brake drum so that the corresponding rear wheel rotating with the brake drum is braked.

The rear left and right wheels RL, RR are also provided with respective electrically operated parking brakes 33, 34, which are both operated by a electric motor 36 upon operation of respective parking brake switches 35. In the event of any electrical abnormality of the braking system, the parking brakes 33, 34 may be operated by operation of a brake operating member in the form of a brake pedal 38.

The electric motors 22, 24, 30, 32, 36 are controlled by the brake control apparatus 18, which includes a main control device 42, five motor control devices (electronic control units: ECUs) 44, 4.6, 48, 50, 52 for controlling the respective electric motors 22, 23, 30, 32, 36, and five motor driver circuits 54, 56, 58, 60, 62 for driving the respective drive motors 22, 23, 30, 32, 36. The electric motors 22, 24, 30, 32, 36 are operated by an electric energy supplied from at least one of two electric power sources in the form of batteries 64, 66. The two batteries 64, 66 cooperate to serve as an electric power source device. The main control device 42 includes a first control device 68 and a second control device 70.

As shown in FIG. 2, the two batteries 64, 66 are operated by an alternator 72, to store therein electric energies. The battery 64 stores the electric energy of 12V, while the battery 66 stores the electric energy of 36V.

In an electric circuit 73 including the battery 64, there are connected in parallel with each other: a group of control devices consisting of the first control device 68, the motor control devices 44, 46 and driver circuits 54, 56 for the front disc brakes 10, 12, the motor control device 48 and driver circuit 58 for the rear left drum brake 14, and the motor control device 52 and driver circuit 62 for the parking brakes 33, 34; a group of 12V electric motors consisting of the electric motor 30 for the rear left drum brake 14, and the electric motor 36 for the parking brakes 33, 34); and a group of 36V electric motors consisting of the electric motors 22, 24 for the front disc brakes 10, 12. The first control device 68 and the motor control devices 44, 46, 48, 52 of the above-indicted group of control devices are connected in parallel with each other. In the group of 12V electric motors, the electric motors 30, 36 are connected in parallel with each other. In the group of 36V electric motors, the electric motors 22, 24 are connected in parallel with each other. Accordingly, the first control device 68, motor control devices 44, 46, driver circuits 54, 56, motor control device 48, driver circuit 58, motor control device 52, driver circuit 62, and electric motors 30, 36, 22, 24 are connected in parallel to the battery 64.

A DC/DC converter 76 is provided between the battery 64 and the group of 36V electric motors, so that the voltage of the battery 64 is raised from 12V to 36V so that the electric energy of 36V is supplied to the 36V electric motors 22, 24. To each of the control devices indicated above, the electric energy is supplied from the battery 64 through respective power source circuits 75a. Each power source circuit 75a is adapted to adjust the voltage to be applied to a CPU, etc. of the control device, within a predetermined range. To the electric motors 12, 14, 30, 36, the electric energy is supplied through respective driver portions 75b, each of which incorporates one or more transistors for controlling the electric current to be applied to the motor.

In an electric circuit including the battery 66, there are connected in parallel with each other: a group of control devices consisting of the second control device 70, the motor control devices 44, 46 and driver circuits 54, 56 for the front disc brakes 10, 12, the motor control device 50 and driver circuit 60 for the rear right drum brake 16, and the motor control device 52 and driver circuit 62 for the parking brakes 33, 34); a group of 36V electric motors including the electric motors 22, 24 for the front disc brakes 10, 12; and a group of 12V electric motors consisting of the electric motor 32 for the rear right drum brake 16, and the electric motor 36 for the parking brakes 33, 34). A DC/DC converter 77 is provided to lower the voltage of the battery 66 from 36V to 12V so that the electric energy of 12V is applied to the control devices 70, 44, 46, 50, 52 and the 12V electric motors 32, 36.

Thus, the batteries 64 and 66 are both connected in parallel to electric actuators in the form of the electric motors 22, 24 and front brake control portions in the form of the motor control devices 44, 46 and driver circuits 54, 56, so that the electric energy can be supplied to the electric motors 22, 24 from the batteries 64, 66 independently of each other. Accordingly, even in the event of occurrence of any abnormality of one of the two batteries 64, 66, the front disc brakes 10, 12 can be activated by the other normal battery 64, 66. The same is true for the electrically operated parking brakes 33, 34. That is, the batteries 64, 66 are connected in parallel to the electric motor 36, motor control device 52 and driver circuit 62. Accordingly, even in the event of occurrence of any abnormality of one of the two batteries 64, 66, the electrically operated parking brakes 33, 34 can be activated by the other normal battery 64, 44.

On the other hand, the two batteries 64, 66 are connected to the respective first and second control devices 68, 70 of the main control device 42. Accordingly, even in the event of an excessive drop of output voltage or other abnormality of one of the batteries 64, 66, which causes the corresponding control device 68, 70 to be inoperable, the other control device 68, 70 is kept normally operable, permitting normal operations of the electrically controlled brakes 10, 12, 14, 16, 33, 34. As described below, the first and second control devices 68, 70 are both adapted to generate control commands for controlling the electric motors 22, 24, 30, 32, 36, so as to permit the appropriate brakes 10, 12, 14, 16, 33, 34 to produce the desired braking forces P1–P5. Namely, the two control devices 68, 70 are interchangeable with each other.

Two power source switching devices 78, 79 are provided for the respective batteries 64, 66. The power source switching device 78 includes two relays 80, 82a connected in parallel with each other. The relay 80 includes a coil 86 which is energized when an ignition switch 84 is turned on, and a switching portion or main switch 88 which is turned from an OFF state to an ON state when the coil is energized. The relay 82a includes a coil 92a which is connected to the battery 64 when a brake switch 90 is turned on, and a switching portion or main switch 94a which is turned from an OFF state to an ON state when the coil 92a is energized.

In the relay 80, the coil 86 is connected to the battery 64 and is energized by the electric energy supplied from the battery 64, when the ignition switch 84 is turned on. In the relay 82a, the brake switch 90 is mechanically turned on and off in response to an operation of the brake pedal 38. That is, the brake switch 90 is turned on when the brake pedal 38 is operated, so that the coil 92a is connected to the battery 64 and is energized by the electric energy supplied from the battery 64. Thus, the power source switching device 78 is turned on in response to either one of the operations of the ignition switch 84 and the brake pedal 38. When the brake pedal 38 is released and the ignition switch 84 is turned off, the power source switching device 78 is turned off. In this arrangement, the electrically operated brakes 10, 12, 14, 16, 33, 34 of the present electrically controlled braking system can be activated by operating the brake pedal 38 even while the ignition switch 84 is off. Thus, the electrically controlled braking system does not require a manually operated brake which is adapted to be activated when the brake pedal 38 is operated while the ignition switch 84 is off. Further, the braking forces P1–P5 produced by the brakes 10, 12, 14, 16, 33, 34 will not change even when the ignition switch 84 is turned on while the brake pedal 38 is in operation. In other words, this arrangement prevents a change in the braking forces which would make the vehicle operator feel uneasy about the braking system.

The power source switching device 79, which also includes two relays 80, 82b connected in parallel to each other, is identical with the power source switching device 78, except that the coil 92b of the relay 82b is connected to the battery 66 and is energized by the electric energy supplied from this battery 66 upon operation of the brake pedal 38.

As described above, the coils 92a, 92b of the relays 82a, 82b of the power source switching devices 78, 79 are adapted to be connected to the respective different batteries 64, 66 in the respective electric circuits 73, 74. If the coil 86 is not energized due to any abnormality such as an excessive output voltage drop of one of the two batteries 64, 66, the power source switching device 78, 79 corresponding to that battery is not turned on in response to an operation of the brake pedal 38, but the other power source switching device 78, 79 is turned on in response to the operation of the brake pedal 38. Since the coils 92a, 92b are connected to the respective batteries 64, 66, one of these coils 92a, 92b which is connected to the normal one of the two batteries 64, 66 can be energized, thereby causing the corresponding power source switching device 78, 79 to be turned on in response to an operation of the brake pedal 38 while the other battery 64, 66 is not normally functioning.

The brake switch 90 of each power source switching device 78, 79 includes two switches 96, 98 connected in series to each other. These switches 96, 98 are turned on and off in response to an operation of the brake pedal 38. The above-indicated coil 92a is energized when the two switches 96a, 98a are both turned on. In other words, if one of the two switches 96a, 98a of the power source switching device 78 is inoperable and kept on for some reason or other, the switching portion 94a can be turned off as long as the other switch 96a, 98a is normal and can be turned off. Thus, the power source switching device 78 can be turned off while the ignition switch 84 is off. Similarly, the switching portion 94b of the power source switching device 79 can be turned off as long as one of the two switches 96b, 98b is normal and can be turned off. Accordingly, the present arrangement is effective to prevent unnecessary continued application of the electric energy to any electric motor, and consequent wasting of the electric energy of the battery device 64, 66.

In the electric circuit 73 including the battery 64, a controller switching device 104 is provided in an exclusive circuit 101 for the 12V electric motors 30, 32, 36, while a controller switching device 106 is provided in an exclusive circuit 102 for the 36V electric motors 22, 24. In words, the switching device 104 is provided between the battery 64 (power source switching device 78) and the 12V electric motors 30, 32, 36, while the switching device 106 is provided between the power source switching device 78 and the 36V electric motors 22, 24. The switching device 104 includes two relays 108, 110 connected in parallel to each other, and is placed in an ON state when at least one of the relays 108, 110 is on, and in an OFF state when both of the relays 108, 110 are off. The relay 108 is turned off when the first control device 68 has any abnormality, and the relay 110 is turned off when the second control device 70 has any abnormality. That is, the switching device 104 is turned off when the first and second control devices 68, 70 are both abnormal, and is kept on as long as at least one of the control devices 68, 70 is normal. Similarly, the switching device 106 includes two relays 112, 114 connected in parallel to each other. The relays 11, 114 are operated in the same manners as the relays 108, 110.

In the electric circuit 74 including the battery 66, a controller switching device 124 is provided in an exclusive circuit 122 for the 12V electric motors 30, 32, 36, while a controller switching device 126 is provided in an exclusive circuit 124 for the 36V electric motors 22, 24. The switching device 124 includes two relays 128, 130 connected in parallel to each other, and the switching device 126 includes two relays 132, 134 connected in parallel to each other. The switching devices 124, 126 in the electric circuit 74 are identical with the switching devices 104, 106 in the electric circuit 73 described above.

For the electric motors 22, 24, 30, 32, 36, there are provided respective actuator switching devices in the form of independent motor switching devices 140, 141, 142, 143, 144, which are provided in respective independent motor circuits 145, 146, 147, 148, 149 in the electric circuits 73, 74. The motor switching device 140 includes two relays 140a, 142a connected in series with each other. The relay 150a is turned off when the motor control device 44 becomes abnormal, while the relay 152a is turned off when the corresponding electric motor 22 becomes abnormal, as described below. Thus, the motor switching device 140 is turned off when at least one of the motor control device 44 and the electric motor 22 becomes abnormal. Each of the motor switching devices 140–144 can be considered to be a switching device exclusively provided for the corresponding brake 10, 12, 14, 16, 33–34, or a switching device exclusively provided for the corresponding wheel.

Each of the other motor switching devices 141–144 includes two relays 150b–152b, 150c–152c, 150d–152d, or 150e–152e, and is turned off when at least one of the corresponding motor control device 46, 48, 50, 52 and electric motors 24, 30, 32, 36 becomes abnormal.

Thus, the motor switching devices 140–144 are provided for the respective electric motors (actuators) 22, 24, 30, 32, 36, that is, for the respective wheels FL, FR, RL, RR, RL-RR, so that each of the electric motors 22, 24, 30, 32, 36 can be connected and disconnected to and from the batteries 64, 66, independently of each other, so that at least one abnormal electric motor is kept at rest or the off state, while the other normal electric motors are kept in operation or in the on state. That is, in the event of abnormality of any of the electric motors 22, 24, 30, 32, 36, the other normal electric motors need not be turned off, and can be operated to activate the corresponding brakes 10, 12, 14, 16, 33–34.

As shown in FIG. 3, the first control device 68 included in the main control device 42 includes two central processing units (CPUs) 160, 162, an electrically erasable programmable read-only memory (EEPROM) 164, a communicating portion 166, and A/D converting portions 168. Similarly, the second control device 70 includes two central processing units (CPUs) 170, 172, an electrically erasable programmable read-only memory 174, a communicating portion 176 and A/D converting portions 178. One of the two CPUs 160, 162 of the first control device 68 serves as a first main CPU (first primary central processing unit), while the other CPU serves as a first sub-CPU (first auxiliary central processing unit). One of the two CPUs 170, 172 of the second control device 70 serves as a second main CPU (second primary central processing unit), while the other CPU serves as a second sub-CPU (second auxiliary central processing unit). Each of these CPUs 160, 162, 170, 172 is arranged to calculate the desired braking force for each of the brakes 10, 12, 14 16, 33, 34, on the basis of brake signals BS which are output signals ST and F of a stroke simulator 230 indicative of the operating stroke and depression force of the brake pedal 38, as indicated in FIG. 1. The stroke simulator 230 includes a stroke sensor 180 and a brake pedal force sensor 182, as indicated in FIG. 3. The stroke sensor 180 is adapted to detect the operating stroke of the brake pedal 38, and the brake pedal force sensor 182 is adapted to detect a depression force acting on the brake pedal 38. The first main CPU 160 uses also vehicle condition signals VS to calculate the desired braking force. The vehicle condition signals VS are output signals of various sensors 183. As also indicated in FIG. 3, these sensors 183 include: a vehicle acceleration sensor for detecting an acceleration value of the automotive vehicle; a yaw rate sensor for detecting a yaw rate of the of the vehicle; a steering angle sensor for detecting the operating angle of the steering wheel; an engine ECU communication switch indicative of data communication of the control device 42 with an engine control unit; a traction control off switch indicating that the traction control is off; wheel speed sensors for detecting rotating speeds of the wheels FL, FR, RL, RR; and a shift position sensor for detecting the currently selected position of an automatic transmission of the vehicle. The desired braking forces calculated by the other CPUs 162, 170, 172 are almost the same as calculated by the CPU 160, when the CPUs 160, 162, 170, 172 are all normal.

The first control device including the first main CPU 160 and the first sub-CPU 162 is substantially the same as the second control device 70 including the second main CPU 170 and the second sub-CPU 172. If one of the batteries 64, 66 is defective, the desired braking forces can be calculated by the control device 68 or 70 which corresponds to the other normal battery 64, 66, so that the operations of the brakes 10, 12, 14, 16, 33, 34 can be suitably controlled.

The desired braking forces calculated by the four CPUs 160, 162, 170, 172 are compared with each other, namely, between the desired braking forces calculated by the main CPU 160, 170 and sub-CPU 162, 172 of the same control device 68, 70, between the desired braking forces calculated by the first and second main CPUs 160, 170 of the two control devices 68., 70, and between the desired braking forces calculated by the two sub-CPUs 162, 172 of the two control devices 68, 70. Where the comparisons indicate that differences of the desired braking forces calculated by the four CPUs 160, 162, 170, 172 are all within a predetermined tolerance range, the CPUs are determined to be normal. In each of the two control devices 68, 70, the desired braking forces calculated by the main CPU and sub-CPU are checked based on the output signals of the stroke sensor 180 and the brake pedal force sensor 182.

The main control device 42 is provided with OR gates or circuits 184, 186, 188 and AND gates or circuits 190, 192, 194, 196. The OR circuit 184 is connected to the first main CPU 160, first sub-CPU 162, and AND circuit 192. When at least one of output signals of the CPUs 160, 162 and AND circuit 192 is an abnormality signal ABN indicative of any abnormality of the CPUs 160, 162, the OR gate 184 generates a signal for de-energizing the coils of the relays 108, 112, 128, 132 and for causing a warning light (not shown) to blink, informing the vehicle operator of the presence of the abnormality. That is, the relays 108, 112, 128, 132 are turned off in any one of the following three cases: when the first main CPU 160 is abnormal; when the first sub-CPU 162 is abnormal; and when the first CPUs 160, 162 are both abnormal.

The OR gate 186 is connected to the second main CPU 170, second sub-CPU 172 and AND circuit 190. The OR gate 186 generates a signal for turning off the relays 110, 114, 130, 134 and for causing the warning light to blink, in any one of the following three cases: when the second main CPU 170 is abnormal; when the second sub-CPU 172 is abnormal; and when the second CPUs 170, 172 are both abnormal.

Thus, the relays 108, 112, 128, 132 are turned off when any abnormality of the first control device 68 takes place, and the relays 110, 114, 130, 134 are turned off when any abnormality of the second control device 70 takes place. Accordingly, the switching devices 104, 106, 124, 126 are held on when at least one of the first and second control devices 68, 70 is normal, and is turned off when both of the control devices 68, 70 become abnormal.

As described above, the switching devices 104, 106, 124, 126 are held on even when one of the first and second control devices 68, 70 is abnormal, so that the electric energy can be supplied to the electric motors 22, 24, 30, 32, 36. In this respect, it is noted that a switching device is not provided between the motor control device 44, 46, 48, 50, 52 and the the electric motor 22, 24, 30, 32, 36, so that the electric energy can be supplied to the electric motors 22, 24, 30, 32, 36 through the switching devices 104, 106, 124, 126 and the motor control devices 44, 46, 48, 50, 52, so as to control the brakes 10, 12, 14, 16, 33, 34, even when the first or second control device 68, 70 becomes abnormal.

Data communication is effected between the main control device 42 and each of the motor control devices 44, 46, 48, 50, 52. From the main control device 42, data indicative of the desired braking forces are supplied to each motor control device 44, 46, 48, 50, 52. From the motor control devices, data indicative of detected actual braking forces and information indicative of the operating condition (e.g., temperature data, failure data) of the electric motors 22, 24, 30, 32, 36 are supplied to the main control device 42. To each of the motor control devices 44, 46, 48, 50, 52, data indicative of the two desired braking forces calculated by the first and second control devices 68, 70 are supplied. The each motor control device uses the desired braking force received from the first main CPU 160, as long as this CPU 160 is normal. As indicated in FIG. 3 with respect to the motor control device 46 for the front left wheel disc brake 12 by way of example, the motor control device 46 applies to the driver circuit 56 current signals Icu, Icv and Icw for the U, V and W phase coils of the electric motor 24, which are determined based on the received desired braking force. Amounts of electric currents Idu, Idv, Idw actually flowing through the U, V and W phase coils of the electric motor 24 are detected by current sensors 202, and are fed to the motor control device 46 through the driver circuit 56. Data indicative of these detected currents Idu, Idv, Idw, which represent the actual braking force produced by the disc brake 12, are transmitted from the motor control device 46 to the main control device 42. In the main control device 42, determinations as to whether the electric motors 22, 24, 30, 32, 36 are normal or not are effected on the basis of the actual braking forces produced.

The data communication between the main control device 42 and the motor control devices 44, 46, 48, 50, 52 is effected through a car area network (CAN), which permits transmission and reception of a large volume of information therebetween in a short time such that different sets of information are transmitted in one direction, and such that a set of information is transmitted in the opposite directions.

The AND circuits 194, 196 and the OR circuit 188 indicated above is provided for each of the five motor control devices 44, 46, 48, 50, 52. Namely, the AND circuits 194a–194e are provided for the respective five motor control devices, and the AND circuits 196a–196e are provided for the respective five motor control devices, while the OR circuits 188a–188a are provided for the respective five motor control devices. In FIG. 3, only one set of the AND circuits 194, 196 and OR gate 188 is shown. The AND circuits 194a, 196b and the OR circuit 188a for the motor control device 44 will be described by way of example. The AND circuit 194a generates a signal indicative of any abnormality of the motor control device 44 when the first main CPU 160 and the first sub-CPU 162 both determine that the motor control device 44 is abnormal. The AND circuit 196a generates a signal indicative of any abnormality of the motor control device 44 when the second main CPU 170 and the second sub-CPU 172 both determine that the motor control device 44 is abnormal. If at least one of these signals is received by the OR gate 188a, the OR gate 188a generates a signal for turning off the relay 150a and causing the appropriate warning light to blink, informing the vehicle operator of the presence of any abnormality of the motor control device 44. Thus, the main control device 42 determines that the motor control device in question is abnormal when both main CPU and sub-CPU of at least one of the first and second control devices 68, 70 determine that the motor control device is abnormal. In this case, the corresponding relay 150 is turned off, to turn off the corresponding motor switching device 140, 141, 142, 143, 144.

When the motor control device 44, 46, 48, 50, 52 is determined to be abnormal, as indicated above, the electric energy is not supplied to the electric motor 22, 24, 30, 32, 36 which corresponds to the abnormal motor control device. However, the electric energies are supplied to the electric motors corresponding to the normal motor control devices, so that the corresponding brakes can be controlled as desired, by the normal motor control devices. That is, an abnormality of one of the motor control devices 44, 46, 48, 50, 52 will not prevent the supply of the electric energies to all of the electric motors.

As indicated in FIG. 3, by way of example, the motor control device 46 applies the current signals Icu, Icv, Icw to the corresponding driver circuit 54, depending upon the desired braking forces represented by the data received from the main control device 42, so that the corresponding electric currents Iu, Iv and Iw are applied from the driver circuit 56 to the respective U, V and W phase coils of the electric motor 24. The electric currents Iu, Iv, Iw to be applied from the driver circuit 56 to the electric motor 24 are controlled by pulse width modulation (PWM) by the motor control device 46, which is adapted to control the duty cycle, frequency, etc. of the current signals Icu, Icv, Icw, for controlling at least one transistor included in the driver portion 75b of the driver circuit 56, so as to apply the controlled electric currents Iu, Iv, Iw to the electric motor 24.

The electric motor 24 is provided with an encoder 200, a current sensor 202, a temperature sensor 204, and a brake force sensor 206. The encoder 200 has a hole element for detecting a relative angular position between the stator and the rotor of the electric motor 24. The current sensor 202 is adapted to detect an electric current flowing through the coils of the stator, and the temperature sensor 204 is adapted to detect the temperature of the stator coils. The brake force sensor 206 is adapted to detect a force which is applied to the friction pads of the disc brake 12 by operation of the electric motor 24, through a rod which is advanced and retracted toward and away from the friction pads as the rotor of the electric motor 24 is rotated. The current signals Icu, Icv, Icw to be applied from the motor control device 46 to the driver circuit 56 are feedback-controlled on the basis of the relative angular position of the stator and the rotor detected by the encoder 200.

As indicated in FIG. 3, the output signals of the encoder 200, current sensor 202, temperature sensor 204 and brake force sensor 206 are fed to the motor control device 46. In the present embodiment, the actual braking force produced by the disc brake 12 is estimated on the basis of the current detected by the current sensor 202, and data indicative of the estimated actual braking force are transmitted to the main control device. 42. The electric currents to be applied to the electric motor 24 are feedback-controlled on the basis of the actual braking force detected by the brake force sensor 206. The temperature detected by the temperature sensor 204 is used for checking the electric motor 24 for abnormality. If the detected temperature or the rate of increase of the detected temperature is higher than a predetermined threshold, the electric motor 24 is determined to be abnormal. In this case, the relay 152b is turned off, and the motor switching device 141 is turned off, so that the electric motor 24 is disconnected from both of the batteries 64, 66, and is prevented from being kept operated.

Thus, the motor switching devices 140–144 are selectively turned off independently of each other when the corresponding electric motors 22, 24, 30, 32, 36 become abnormal, so that only the abnormal electric motor or motors is/are turned off, while the normal electric motor or motors is/are held in operation or operable, whereby the brake or brakes corresponding to the normal electric motor or motors can be activated. That is, an abnormality of any electric motor will not prevent normal operations of the other normal electric motors for activating the corresponding brakes.

While the motor control device 46 has been described above, the description applies to the other motor control devices 44, 48, 50, 52.

In the present braking system, the electric motors 22, 24 used for the front disc brakes 10, 12 are brushless DC motors, while the electric motors 30, 32 used for the rear drum brakes 14, 16 and the electric motor 36 used for the parking brakes 33, 34 are DC motors. The stator of the brushless DC motor has a U-phase coil, a V-phase coil and a W-phase coil which are energized by the electric currents Iu, Iv, Iw, the duty cycles of which are controlled depending upon the output signal of the encoder 200, for example. The brushless DC motor has a comparatively higher degree of durability owing to the absence of brushes.

The electric motors 22, 24 for the front disc brakes 10, 12 have a 36V rating, while the electric motors 30, 32 for the rear drum brakes 14, 16 have a 12V rating. Accordingly, the front disc brakes 10, 12 are capable of producing larger braking forces than the rear drum brakes 14, 16.

In the present embodiments, the motor control devices 44, 46, 48, 50, 52 are attached to a suitable member of the vehicle body such that each motor control device is disposed near the corresponding wheel. As indicated above, data communication is effected between the main control device 42 and each motor control device 44, 46, 48, 50, 52, and between the motor control device and the corresponding driver circuit 54, 56, 58, 60, 62. To this end, it is desirable to minimize the distances between the main control device 42 and the motor control devices, and the distances between the motor control devices and the driver circuits. These distances may be reduced if the motor control devices are integrated with the main control device. However, this arrangement results in an increase in the cost of manufacture, due to requirements for increased data storage capacity and an increased number of input and output ports. Further, the arrangement results in increased distances between the driver circuits and the electric motors. For these reasons, therefore, the arrangement in question is not desirable.

Where the driver circuits and the motor control devices are spaced a relatively long distance from the main control device 42, that is, where the distances therebetween are comparatively long, a relatively long time is required for the data communication therebetween. While the driver circuits must be disposed on an unsprung member of the vehicle, the motor control devices if also disposed on an unsprung member are subject to vibrations having a comparatively large amplitude. In this respect, it is not desirable to dispose the motor control devices on the unsprung member.

In view of the above, the motor control devices in the present braking system are disposed on a sprung member of the vehicle and positioned near the driver circuits. Although this arrangement results in relatively long distances between the main control device 42 and the motor control devices, these devices will not suffer from undesirable noises, since they are disposed on the sprung member. Further, the data communication between the main control device and the motor control devices through the CAN (car area network) permits high-speed transmission of a large volume of information in a relatively short time even where the communication distances are relatively long. The motor control devices disposed on the spring member are protected from vibrations of a large amplitude. The driver circuits may also be disposed on a sprung member.

Figure 4:
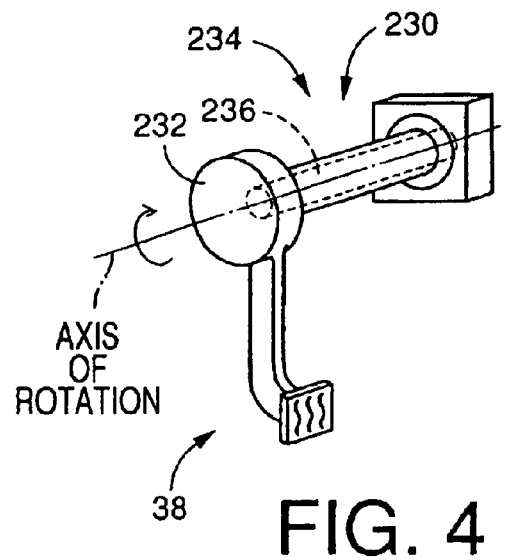
FIG. 4 is a perspective view showing a brake pedal and related components in the braking system of FIG. 1.
Figure 5:
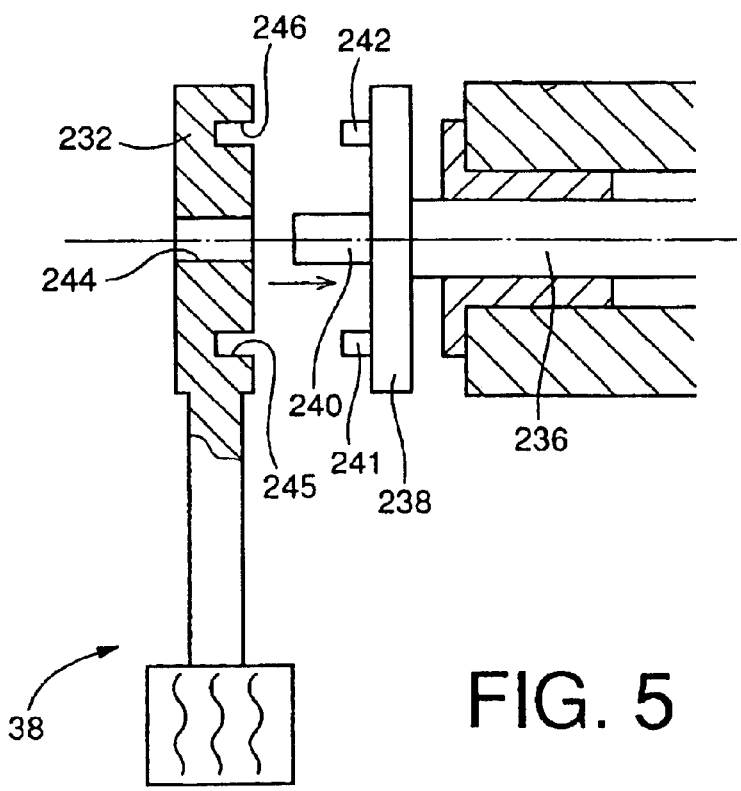
FIG. 5 is a front elevational view in cross sectional of the brake pedal and the related components of FIG. 4.
Figure 6:
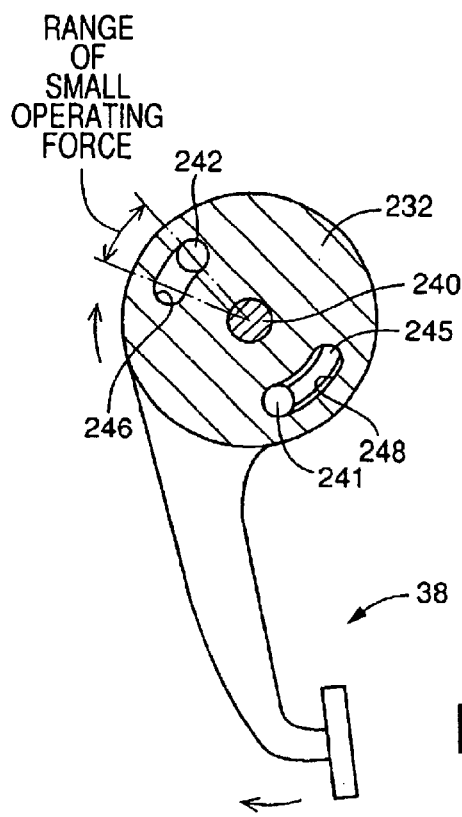
FIG. 6 is a side elevational view in cross section of the brake pedal and the related components.

Referring next to FIGS. 4–6, there will be described the above-indicated stroke simulator 230 provided in the present electrically operated braking system. The stroke simulator 230 is attached to the brake pedal 38, which is attached at a proximal portion 232 thereof to a mount 234 such that the brake pedal 38 is pivotable about an axis. The mount 234 includes a torsion bar 236 and a connector 238. The torsion bar 236 is attached at its one end to a suitable member of the vehicle body, and is associated at the other end to the brake pedal 38 through the connecting portion 238 such that the torsion bar 236 is not rotatable relative to the brake pedal 38, except during an initial period of an operation (pivotal movement) of the brake pedal 38. As the brake pedal 38 is pivotally operated, the torsion bar 236 and the connector 238 permit an increase in the operating stroke of the brake pedal 38 during an initial period of operation of the brake pedal 38, and the torsion bar 236 is twisted as the operating force acting on the brake pedal 38 is increased beyond a given value, permitting a further increase in the operating stroke of the brake pedal 38.

As shown in FIG. 5, the connecting portion 238 fixed to the above-indicated other end of the torsion bar 236 takes the form of a circular disc which has a central boss 240 located at an axis of rotation thereof, and two pins 241, 242 located at respective radially intermediate positions thereof. The proximal portion 232 of the brake pedal 38 has a central connecting hole 244 corresponding to the central boss 240, and two elongate arcuate grooves 245, 246 formed in one of its opposite surfaces which faces the connecting portion 238.

The central boss 240 engages the central connecting hole 244 while the two pins 241, 242 engages the respective arcuate grooves 245, 246. As shown in FIG. 6, the arcuate groove 246 has a smaller length than the arcuate groove 245, and an elastic member 248 is disposed in the arcuate groove 245.

When the brake pedal 38 is placed at its non-operated position, each of the two pins 241, 242 is located at a downstream one of the opposite ends of the corresponding arcuate groove 245, 246, as seen in the rotating direction of the proximal portion 232 of the brake pedal 38. When the brake pedal 38 is depressed, the proximal portion 232 is rotated relative to the pins 241, 242 such that the pins 241, 242 are moved within the respective grooves 245, 256 toward the upstream end of each groove. As the pins 241, 242 are moved within the grooves 245, 246 during an initial period of the pivotal movement of the brake pedal 38, the elastic member 248 is elastically deformed permitting an increase in the operating stroke of the brake pedal 38, but substantially no twisting of the brake pedal 38, but substantially no twisting of the torsion bar 236 takes place during this initial period. After the pins 240, 241 have been brought into abutting contact with the upstream ends of the arcuate grooves 245, 246, the torsion bar 236 is twisted as the brake pedal 38 is further depressed. Thus, the operating stroke of the brake pedal 38 increases as the operating force increases. The stroke simulator 230 gives different operating characteristics of the brake pedal 38 during the initial and subsequent periods of operation or pivotal rotation of the brake pedal 38, thus simulating the operating stroke of the brake pedal 38 which would be obtained if the operating force were directly used to activate the brakes 10, 12, 14, 16, 33, 34.

As indicated above, the stroke sensor 180 and brake pedal force sensor 182 which have been described are provided on the stroke simulator 230. The operating stroke of the brake pedal 38 is detected by the stroke sensor 180, on the basis of an angular position of the torsion bar 236 relative to the vehicle body member to which the torsion bar is attached. The operating force acting on the brake pedal 38 is detected by the brake pedal force sensor 182, on the basis of an amount of surface strain of the torsion bar 236.

Figure 7:
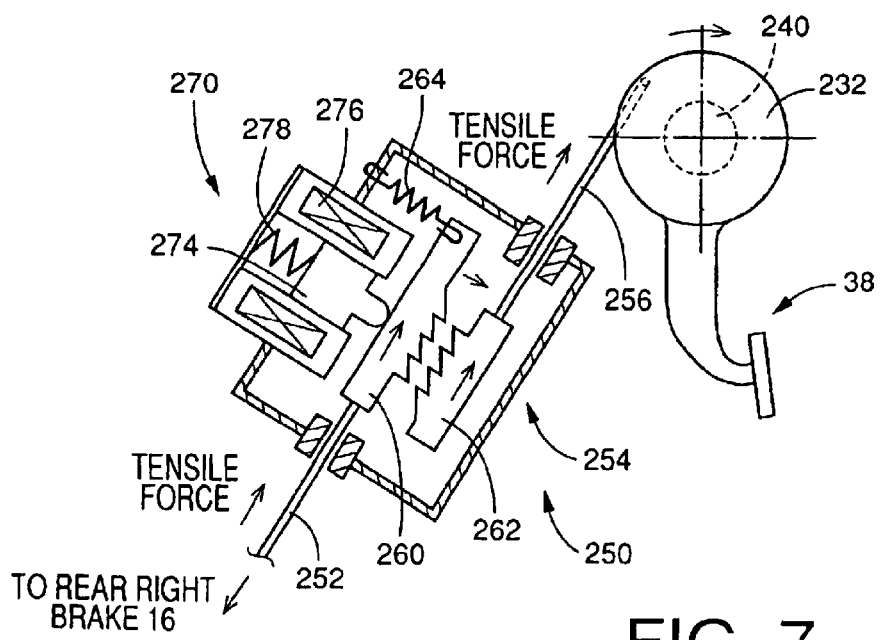
FIG. 7 is a cross sectional view of a switching device included in the braking system of FIG. 1.

The automotive vehicle including the present electrically operated braking system further includes a manually operated emergency brake device 250, which includes: the brake pedal 38; the parking brakes 33, 34 provided on the rear left and right wheels RL, RR; a first wire 252 for operating the parking brakes 33, 34; a force transmitter 254 serving as a switching mechanism; and a second wire 256 for connected to the brake pedal 38 such that the second wire 256 is pulled when the brake pedal 38 is operated. The first wire 252 is used for transmitting a force for forcing the friction members in the form of brake linings of the parking brakes 33, 35 onto the brake drums which are also used for the rear drum brakes 14, 16. The first wire 252 is connected at its one end to the force transmitter 254, as shown in FIG. 7, and at its other end to a linkage 257, as shown in FIG. 1. To the linkage 257, there are connected two third wires 258 which are pulled for operating the parking brakes 33, 34 when the first wire 252 is pulled by the brake pedal 38.

The force transmitter 254, which selectively transmits the operating force of the brake pedal 38 to the first wire 252, includes: first engaging portion 260 to which the first wire 252 is connected; a second engaging portion 262 to which the second wire 256 is connected; a first spring 264 for biasing the first engaging portion 260 in a direction of disengagement of the first engaging portion 260 from the second engaging portion 262; and an actuator 270 for selective engagement and disengagement of the first and second engaging portions 260, 262.

The actuator 270, which serves as a switching control device, includes a plunger 274, a solenoid coil 276, and a spring 278. The solenoid coil 276 is normally held in an energized state for holding the plunger 274 in its retracted position for holding the first and second engaging portions 260, 262 in their disengaged state. In this state, the first and second wires 252, 256 are not connected to each other. When the solenoid coil 276 is de-energized, the plunger 274 is moved to its advanced position by the biasing force of the spring 278, against the biasing force of the first spring 264, whereby the first engaging portion 260 is moved by the plunger 274, for engagement with the second engaging portion 262, so that the first and second wires 252, 256 are connected to each other by the force transmitter 254.

The solenoid coil 276 is de-energized when the supply of an electric current to the main control device 42 and motor control devices 44, 46, 48, 50, 52 is interrupted in the event of some electrical abnormality of the electric system. As a result, the pull force corresponding to the operating force of the brake pedal 38 is applied to the brake linings of the parking brakes 33, 34 through the second wire 256, first wire 252 and third wires 258, so that the parking brakes 33, 34 are activated as mechanically operated emergency brakes. Normally, the parking brakes 33, 34 are activated when a fourth wire 280 is pulled by operation of the electric motor 36 upon operation of the parking brake switch 35. The linkage 257 to which the first and fourth wires 252, 280 are connected is constructed such that the third wire 258 is pulled when one of the first and fourth wires 252, 280 is pulled by operation of the brake pedal 38 or electric motor 36.

Figure 8:
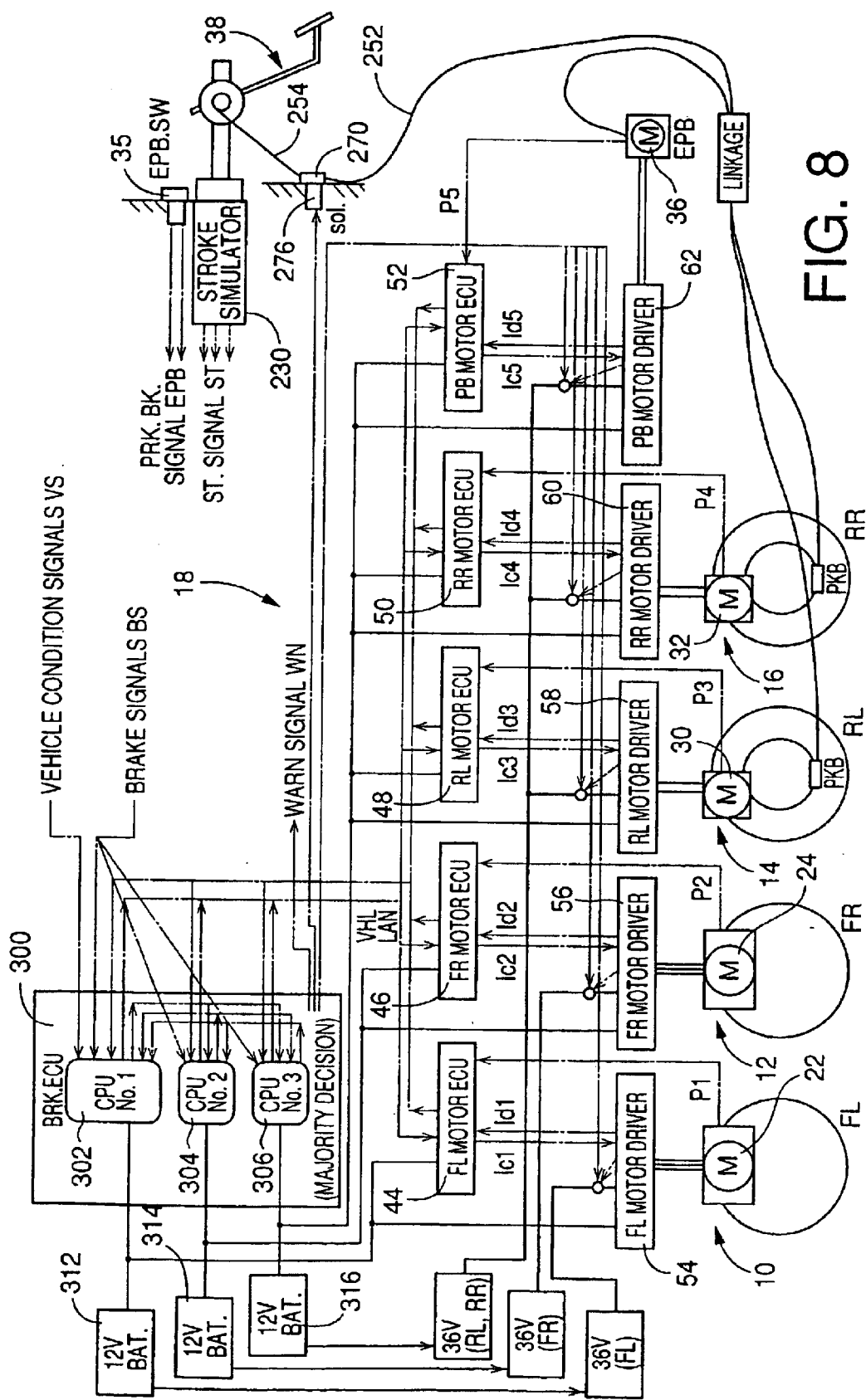
FIG. 8 is a schematic view showing an electrically controlled braking system constructed according to another embodiment of this invention.
Figure 9:
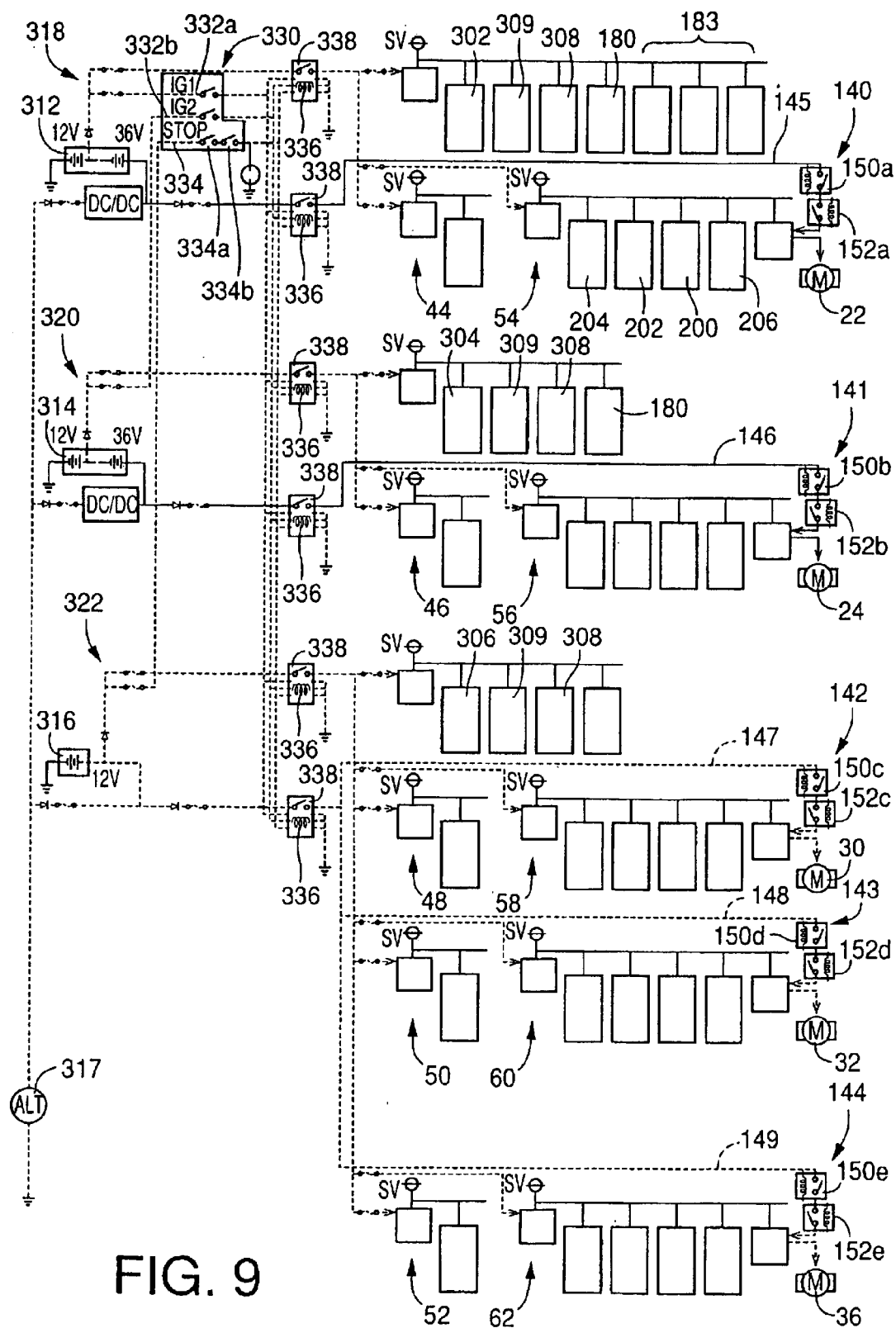
FIG. 9 is a diagram showing an electrical circuitry of the braking system of FIG. 8.
Figure 10:
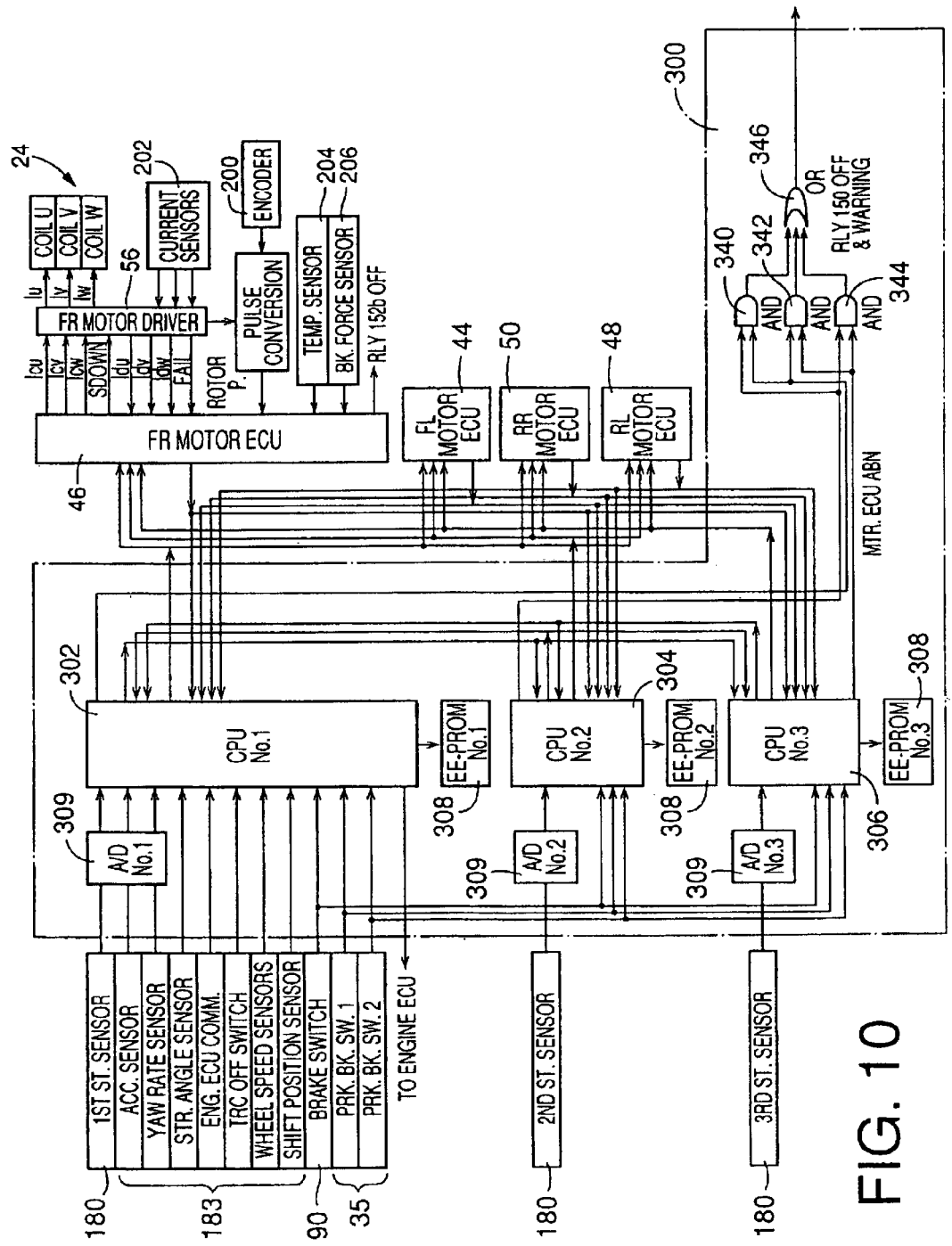
FIG. 10 is a block diagram showing a control apparatus of the braking system of FIG. 8.

Referring next to FIGS. 8–10, there will be described an electrically controlled braking system constructed according to a second embodiment of this invention. The same reference numerals and signs as used in the first embodiment will be used in the second embodiment, to identify the corresponding elements, and redundant description of these elements will not be provided.

The present braking system uses a main control device 300 which includes three CPUs 302, 304, 306, three EEPROMs 308 corresponding to the CPUs 302, 304, 306, and three A/D converters 309 corresponding to the CPUs 302, 304, 306. As shown in FIG. 9, three batteries 312, 314, 316 are connected to the respective three CPUs 302, 304, 306. An alternator 317 is connected to the three batteries 312, 314, 316, for storing electric energies therein. Each of the batteries 312 and 314 is adapted to store the electric energies of 12V and 36V, while the battery 316 is adapted to store the electric energy of 12V. Each of the batteries 312, 314 has two terminals used to supply the electric energies of 12V and 36V, respectively. The batteries 312, 314, 316 cooperate to serve as an electric power source device.

In an electric circuit 318 including the battery 312, this battery 312 is connected to a first group of control devices consisting of the first CPU 302 and the motor control device 44 and driver circuit 54 for the front left wheel FL, and to the electric motor 22 for the front left wheel FL. In an electric circuit 320 including the battery 314, this battery 314 is connected to a second group of control devices consisting of the second CPU 304 and the electric motor 46 and driver circuit 56 for the front right wheel FR, and to the electric motor 24 for the front right wheel FR. In an electric circuit 322 including the battery 316, this battery 316 is connected to a third group of control devices consisting of the third CPU 306, the motor control devices 48, 50 and driver circuits 58, 60 for the rear left and right wheels RL, RR and the motor control device 52 and driver circuit 62 for the parking brakes 33, 34, and to a group of electric motors consisting of the electric motors. 30, 32 for the rear left and right wheels FL, FR and the electric motor 36 for the parking brake 36. The electric energies of the batteries 312, 314, 316 are supplied to the respective first, second and third CPUs 302, 304, 406, independently of each other, so that even in the event of abnormality of one or two of the batteries 312, 314, 316, the CPU or CPUs corresponding to the normal one or ones of the three batteries can be normally operated, permitting the normal operation of the brakes 10, 12, 14, 16, 33, 34.

A power source switching device 330 (FIG. 9) is turned on when at least one of switches 332a, 332b of an ignition switch and a brake switch 334 is turned on, and is turned off when all of the switches 332a, 332b and brake switch 334 are turned off. When at least one of the switches 332a, 332b and brake switch 334 is turned on, a coil 336 is energized, and a switching portion 338 is turned on. As in the first embodiment, the brake switch 334 includes two switches 334a, 334b connected in series with each other, and is turned off when one of these two switches is turned off. While the two switches 332a, 332b are shown in FIG. 9 such that these two switches are connected in series with each other, there is actually a single ignition switch which is operated by the vehicle operator. FIG. 9 shows the two switches 332a, 332b whose operating states are changed in response to an operation of the ignition switch.

In the present second embodiment, the ignition switch 332a is connected to the battery 312, while the ignition switch 332b is connected to the battery 314. When one of the two batteries 312, 314 is normal, the power source switching device 330 can be turned on when the ignition switch is turned on. Similarly, when the battery 316 is normal, the power source switching device 330 can be turned on when the brake switch 334 is turned on with the brake pedal 38 being operated.

As indicated in FIG. 10, each of the three CPUs 302, 304, 306 calculates the desired braking force on the basis of the operating stroke of the brake pedal 38 detected by the stroke sensor 180, and applies the appropriate current signals Icu, Icv, Icw to each motor control device 44, 46, 48, 50, 52, which determines the desired braking force value by decision of majority on the basis of the three desired braking force values received from the three CPUs, and applies the appropriate amounts of electric current Iu, Iv, Iw to the corresponding electric motor 22, 24, 30, 32 through the corresponding driver circuit 54, 56, 58, 60.

As in the first embodiment, the signals indicative of the detected actual current values Idu, Idv, Idw are fed from each driver circuit to the main control device 300 through the motor control device, so that the CPUs 302, 304, 306, 308 can check if the corresponding motor control devices 54, 56, 58, 60 are normal. When any of the motor control devices is abnormal, signals MTR. ECU ABN indicating the abnormality are applied to two of three AND circuits 340, 342, 444 provided for the corresponding one of the five motor control devices 44, 46, 48, 50, 52. As in the first embodiment, the AND circuits are provided 340a, 342a, 344a are provided for the motor control device 44, and the AND circuits 340b, 342b, 344b are provided for the motor control device 46. Similarly, the three AND circuits 340, 342, 344 are provided for each of the other motor control devices 48, 50, 52. In FIG. 10, only one set of AND circuits 340, 342, 344 is shown, in the interest of brevity.

The first CPU 302 is connected to the two AND circuits 340, 342, and the second CPU 304 is connected to the two AND circuits 340, 344, while the third CPU 306 is connected to the two AND circuits 342, 344. The three AND circuits 340, 342, 344 are connected to an OR circuit 346. When the OR circuit 346 receives an abnormality signal from at least one of the three AND circuits 340, 342, 344, the OR circuit 346 generates a signal for de-energizing the coil of the relay 150 and for causing the warning light to be activated to indicate that the corresponding motor control device is abnormal. With the relay 150 being turned off, the corresponding motor switching device is turned off, as in the first embodiment. Namely, when at least two of the three CPUs determine that a certain one of the motor control devices 44, 46, 48, 50, 52 is abnormal, the abnormality signal is generated from the corresponding OR circuit 346.

If some abnormality of the motor control device 44 is detected by the first and second CPUs 302, 304, abnormality signals are applied from the CPU .302 to the AND circuits 340a, 342a, and from the CPU. 304 to the AND circuits 340a, 344a. As a result, the abnormality signal is fed from the AND circuit 340a to the OR circuit 346a, and the OR circuit 346a generates the signal for turning off the relay 150a.

If one of the desired braking force values calculated by the three CPUs 302, 304, 306 is determined to be abnormal by decision by majority, the coil 336 in the electric circuit corresponding to the CPU in question is de-energized, to turn off the switching portion 338. The determination for abnormality of the calculated desired braking force values is also based on the output signal of the stroke sensor 180.

In the electrically controlled braking system according to the present second embodiment, data communication is effected through local area network (LAN), which is similar to the car area network (CAN) employed in the first embodiment. While the motor control device 52 for the parking brakes 33, 34 is not shown in FIG. 10, the data communication as described above applies to the motor control device 52.

In the present embodiment wherein the three CPUs 302, 304, 306 are used, the determination on abnormality of the braking system can be easily made according to decision by majority. Since each of the three CPUs is powered by the exclusive battery, the brakes 10, 12, 14, 16, 33, 34 can be activated unless the three batteries are abnormal.

Although the electric motors 22, 24 for the front wheels are brushless DC motors while the electric motors 30, 32, 36 for the rear wheels are DC motors, all of these motors are DC motors or brushless DC motors. Further, other types of motors such as 3-phase AC motors and ultrasonic motors may be used, and all of the motors for the front and rear wheels may be 36V motors or 12V motors. While the disc brakes 10, 12 are used for the front wheels and the drum brakes 14, 16 are used for the rear wheels, the brakes for all of the four wheels may be disc brakes or drum brakes. Further, the illustrated embodiments may be suitably modified in connection with the number of the batteries and/or switching devices used. In the first embodiment, the brake switch 90 of the power source switching devices 78, 79 includes the two switches 96, 98 connected in series with each other, the brake switch 90 may include three or more switches. The switching devices are not limited to those including relays, but may use transistors, and may or may not include contactors. It will be understood that the present invention may be embodied with various other modifications such as those described in the SUMMARY OF THE INVENTION, which may occur to those skilled in the art. For instance, the logic circuit arrangements including the AND and OR circuits may be replaced by software programs.

What is claimed is:

1. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:

a switching device disposed between said electric power source device and at least said brake control apparatus, said switching device being turned on for connecting said electric power source device to said at least said brake control apparatus, in response to an operation of said brake operating member, wherein said electrically controlled brake includes a front brake for braking a front wheel, wherein said brake control apparatus includes a front brake control device for controlling an operation of said front brake, wherein said electric power source device includes a plurality of electric power sources which are arranged to supply electric energies to said front brake control device independently of each other, and wherein said switching device includes a plurality of switching devices each of which is provided for a corresponding one of said plurality of electric power sources so as to selectively permit and inhibit supply of the electric energy by the corresponding one of said plurality of electric power sources.

2. An electrically controlled braking system according to claim 1, wherein said rear brake includes a first rear brake and a second rear brake, and said rear brake control device includes a first rear brake control device for controlling said first rear brake and a second rear brake control device for controlling said second rear brake, said first rear brake being connected to one of said plurality of electric power sources while said second rear brake control device being connected to another of said plurality of electric power sources.

3. An electrically controlled braking system according to claim 1, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

4. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:

a switching device disposed between said electric power source device, and at least one of said brake control apparatus and said brake, said switching device being turned on for connecting said electric power source device to said at least one of said brake control apparatus and said brake, in response to an operation of said brake operating member, wherein said electrically controlled brake includes a front left brake for braking a front left wheel, a front right brake for braking a front right wheel, a rear left brake for braking a rear left wheel and a rear right brake for braking a rear right wheel, wherein said brake control apparatus includes a front left brake control device for controlling said front left brake, a front right brake control device for controlling said front right brake, a rear left brake control device for controlling said rear left brake and a rear right brake control device for controlling said rear right brake, and wherein said electric power source device includes a front left brake power source arranged to supply the electric energy to said front left brake control device without supplying the electric energy to said front right brake control device, a front right brake power source arranged to supply the electric energy to said front right brake control device without supplying the electric energy to said front left brake control device, and a common rear brake power source arranged to supply an electric energy to both of said rear left and right brake control devices.

5. An electrically controlled braking system according to claim 4, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

6. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:

a switching device disposed between said electric power source device, and at least said brake, said switching device being turned on for connecting said electric power source device to said at least said brake, in response to an operation of said brake operating member, wherein said electrically controlled brake includes a front rotor rotating with a front wheel, a front friction member, and an electrically operated front brake actuator for forcing said front friction member onto said front rotor, wherein said electric power source device includes a plurality of electric power sources including at least two electric power sources arranged to supply electric energies to said front brake actuator independently of each other, and wherein said switching device includes a plurality of switching devices each of which is provided for a corresponding one of said plurality of electric power sources so as to selectively permit and inhibit supply of the electric energy by the corresponding one of said plurality of electric power sources.

7. An electrically controlled braking system according to claim 6, wherein said electrically controlled brake further includes two electrically operated rear brake actuators each of which is arranged to force a rear friction member onto a rear rotor rotating with a corresponding one of rear left and right wheels, and wherein said plurality of electric power sources include two electric power sources provided for said two rear brake actuators, respectively.

8. An electrically controlled braking system according to claim 6, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

9. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:

a switching device disposed between said electric power source device, and at least one of said brake control apparatus and said brake, said switching device being turned on for connecting said electric power source device to said at least one of said brake control apparatus and said brake, in response to an operation of said brake operating member, wherein said electrically controlled brake includes a plurality of brakes for braking respective wheels of the automotive vehicle, said brakes including respective electrically operated electric motors each of which is arranged to force a friction member onto a rotor rotating with a corresponding one of the wheels, said braking system further comprising a plurality of actuator switching devices each of which is disposed between said electric power source device and a corresponding one of said electric motors, each of said actuator switching devices being operable between a connecting state for connecting said electric power source device to the corresponding electric motor, and a disconnecting state for disconnecting said electric power source device from said corresponding electric motor, and wherein said brake control apparatus includes motor control devices for controlling said electric motors, respectively, and each of said plurality of actuator switching devices includes two switches connected in series with each other, one of said two switches of said each of said actuator switching devices being turned off when the corresponding electric motor becomes abnormal, the other of said two switches being turned off when the corresponding motor control device becomes abnormal.

10. An electrically controlled braking system according to claim 9, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

11. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:

a switching device disposed between said electric power source device and said brake, wherein said switching device includes a first switch and a second switch which are connected in parallel with each other, said first switch comprising at least one of an ignition switch of the automotive vehicle, and a switch which is turned on and off in response to an operation of said ignition switch, said second switch being turned on and off in response to an operation of said brake operating member, said switching device being turned on for connecting said electric power source device to said brake, in response to either one of the operations of said ignition switch and said brake operating member.

12. An electrically controlled braking system according to claim 11, wherein said first switch comprises said switch which is turned on and off in response to the operation of said ignition switch.

13. An electrically controlled braking system according to claim 11, wherein said first switch comprises said ignition switch.

14. An electrically controlled braking system according to claim 11, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

15. An electrically controlled braking system according to claim 11, wherein said electrically controlled brake includes a rotor for rotating with said wheel, a friction member, and an electrically operated actuator for forcing said friction member onto said rotor, said switching device is disposed between said electric power source device and said actuator.

16. An electrically controlled braking system according to claim 11, wherein said electrically controlled brake includes a rotor for rotating with said wheel, a friction member, and an electrically operated actuator for forcing said friction member onto said rotor, said braking system further comprising another switching device disposed between said electric power source device and said actuator, said another switching device being turned on to connect said electric power source device to said actuator in response to an operation of said brake operating member.

17. An electrically controlled braking system according to claim 11, wherein said brake control apparatus includes a plurality of control devices each of which is principally constituted by a computer, and said electric power source device includes a plurality of electric power sources corresponding to said plurality of control devices, respectively.

18. An electrically controlled braking system according to claim 17, wherein said plurality of control devices are substantially identical with each other.

19. An electrically controlled braking system according to claim 17, wherein said brake control apparatus includes a control on/off device for continuing a control of the electrically controlled braking system when at least one predetermined control device of said plurality of control devices is normal, and stopping the control of said electrically controlled braking system when said at least one predetermined control device is not normal.

20. An electrically controlled braking system according to claim 17, wherein said brake control apparatus includes an abnormality detecting device for detecting that at least one of said plurality of control devices is abnormal.

21. An electrically controlled braking system according to claim 20, wherein each of said plurality of control devices includes a plurality of central processing units, and said abnormality detecting device includes a CPU abnormality detecting device for detecting that at least one of said plurality of central processing units is abnormal.

22. An electrically controlled braking system according to claim 11, wherein said brake control apparatus includes at least three control devices each of which is principally constituted by a computer.

23. An electrically controlled braking system according to claim 11, wherein said brake control apparatus includes at least one control device each of which is principally constituted by a computer, and said electric power source device includes a plurality of electric power sources which are arranged to supply electric energies to each of said at least one control device independently of each other.

24. An electrically controlled braking system according to claim 11, wherein said electrically controlled brake includes an electrically operated front brake actuator for forcing a friction member onto a rotor rotating with a front wheel, and an electrically operated rear brake actuator for forcing a friction member onto a rotor for rotating with a rear wheel, and said electric power source device includes a front brake power source for supplying an electric energy to said electrically operated front brake actuator and a rear brake power source for supplying an electric energy to said electrically operated rear brake actuator.

25. An electrically controlled braking system according to claim 11, wherein said electrically controlled brake includes a plurality of brakes for braking respective wheels of the automotive vehicle, said brakes including respective electrically operated electric motors each of which is arranged to force a friction member onto a rotor for rotating with a corresponding one of the wheels, said braking system further comprising a plurality of actuator switching devices each of which is disposed between said electric power source device and a corresponding one of said electric motors, each of said actuator switching devices being operable between a connecting state for connecting said electric power source device to the corresponding electric motor, and a disconnecting state for disconnecting said electric power source device from said corresponding electric motor.

26. An electrically controlled braking system according to claim 11, wherein said electrically controlled bake includes a rotor for rotating with said wheel, a friction member, and an electrically operated actuator for forcing said friction member onto said rotor, and said brake control apparatus includes a main control device which determines a physical quantity relating to a desired value of a braking force to be produced by said brake and generates a control command representative of the determined physical quantity, and an actuator control device which controls said electrically operated actuator according to said control command and generates a signal representative of a physical quantity relating to an actual value of the braking force produced by said brake.

27. An electrically controlled braking system according to claim 26, wherein said actuator control device is spaced from said main control device and disposed on a sprung member of the automotive vehicle such that said actuator control device is located near said actuator, said main control device and said actuator control device have means for data communication therebetween through a local area network (LAN).

28. An electrically controlled braking system according to claim 26, wherein said main control device includes an abnormality detecting device for detecting an abnormality of said actuator control device, on the basis of said signal representative of the physical quantity relating to said actual value of the braking force produced by said brake.

29. An electrically controlled brake system according to claim 11, further including a mechanically operated brake mechanically operated by said brake operating member, and wherein said brake control apparatus includes a switching mechanism operable between a connecting state in which an operating force applied to said brake operating member upon operation of said brake operating member is transmitted to said mechanically operated brake and a disconnecting state in which said operating force is not transmitted to said mechanically operated brake, said brake control apparatus further including a switching control device which is normally placed in said disconnecting state, and is brought into said connecting state when an electrical abnormality of the electrically braking system takes place.

30. An electrically controlled braking system including an electrically controlled brake for braking a wheel of an automotive vehicle, an electric power source device, a brake operating member, and a brake control apparatus for controlling an electric energy to be supplied from said electric power source to said brake, for thereby controlling an operation of said brake, when said brake operating member is operated, said braking system comprising:
  a switching device disposed between said electric power source device, and at least one of said brake control apparatus and said brake,
  wherein said switching device includes a first switch and a second switch which are connected in parallel with each other, said first switch comprising at least one of an ignition switch of the automotive vehicle, and a switch which is turned on and off in response to an operation of said ignition switch, said second switch being turned on and off in response to an operation of said brake operating member, said switching device being turned on for connecting said electric power source device to at least one of said brake control apparatus and said brake, in response to either one of the operations of said ignition switch and said brake operating member,
  and wherein said electrically controlled brake includes a rotor for rotating with said wheel, a friction member, and an electrically operated actuator for forcing said friction member onto said rotor.

31. An electrically controlled braking system according to claim 30, wherein said first switch comprises said switch which is turned on and off in response to the operation of said ignition switch.

32. An electrically controlled braking system according to claim 30, wherein said first switch comprises said ignition switch.

33. An electrically controlled braking system including an electrically controlled brake for braking a wheel of an automotive vehicle, an electric power source device, a brake operating member, and a brake control apparatus for controlling an electric energy to be supplied from said electric power source to said brake, for thereby controlling an operation of said brake, when said brake operating member is operated, said braking system comprising:
  a switching device disposed between said electric power source device, and at least one of said brake control apparatus and said brake; and
  a detecting device which detects at least one of an operating stroke of said brake operating member and a depression force acting on said brake operating member,
  wherein said switching device includes a first switch and a second switch which are connected in parallel with each other, said first switch comprising at least one of an ignition switch of the automotive vehicle, and a switch which is turned on and off in response to an operation of said ignition switch, said second switch being turned on and off in response to an operation of said brake operating member, said switching device being turned on for connecting said electric power source device to at least one of said brake control apparatus and said brake, in response to either one of the operations of said ignition switch and said brake operating member,
  and wherein said brake control apparatus determines a desired braking force to be produced by said brake, on the basis of at least one of said operating stroke and said depression force detected by said detecting device, and controls said electric energy such that said desired braking force is produced by said brake.

34. An electrically controlled braking system according to claim 33, wherein said first switch comprises said switch which is turned on and off in response to the operation of said ignition switch.

35. An electrically controlled braking system according to claim 33, wherein said first switch comprises said ignition switch.

36. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:
  a switching device disposed between said electric power source device and at least one of said brake control apparatus and said brake, said switching device being turned on for connecting said electric power source device to said at least one of said brake control apparatus and said brake, in response to an operation of said brake operating member,
  wherein said electrically controlled brake includes a rotor rotating with said wheel, a friction member, and an electrically operated actuator for forcing said friction member onto said rotor, said braking system comprising an electric circuit in which said actuator and said brake control apparatus are connected to said electric power device such that said actuator and said brake control apparatus are connected in parallel with each other, and wherein said switching device is disposed in a common portion of said electric circuit which serves to connect said electric power source device to both of said actuator and said brake control apparatus.

37. An electrically controlled braking system according to claim 36, further comprising a controller switching device which is turned off to disconnect said electrically operated actuator from said electric power source device when said brake control apparatus is abnormal, said controller switching device being disposed in an exclusive portion of said electric circuit which serves to connect said electric power source device to only said actuator.

38. An electrically controlled braking system according to claim 37, wherein said controller switching device includes a plurality of switches connected in parallel with each other, and said brake control apparatus includes a plurality of control devices which are principally constituted by respective computers and which correspond to said plurality of switches, respectively, and a switch control device for turning off one of said plurality of switches of said controller switching device when one of said control devices which corresponds to said one of said plurality of switches becomes abnormal.

39. An electrically controlled braking system according to claim 36, wherein said electric power source device includes a plurality of electric power sources, and said switching device includes a main switch provided in said common portion of said electric circuit which includes one of said electric power sources, a plurality of coils which are energized and de-energized to turn on and off said main switch, a plurality of coil connecting circuits for connecting said plurality of coils to said plurality of electric power sources, and a plurality of brake switches which are respectively provided in said coil connecting circuits and which are turned on when said brake operating member is operated.

40. An electrically controlled braking system according to claim 36, wherein said electric power source device includes a plurality of electric power sources, and said electrically controlled brake includes a plurality of electrically operated actuators, said brake control apparatus including a plurality of actuator control devices for controlling said plurality of actuators, respectively, said braking system comprising a plurality of electric circuits each of which includes a corresponding one of said electric power sources, a corresponding one of said actuators and a corresponding one of said actuator control devices, said switching device including a main switch provided in each of said plurality of electric circuits, a coil which is energized and de-energized to turn on and off said main switch, a coil connecting circuit for connecting said coil to said corresponding one of said electric power sources, and a brake switch which is provided in said coil connecting circuit and which is turned on when said brake operating member is operated.

41. An electrically controlled braking system according to claim 36, wherein said electrically controlled brake includes a rotor for rotating with said wheel, a friction member, and an electric motor for forcing said friction member onto said rotor, and said brake control apparatus includes a motor control device for controlling the electric energy to be supplied from said electric power source device to said electric motor.

42. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:
   a switching device disposed between said electric power source device, and at least one of said brake control apparatus and said brake, said switching device being turned on for connecting said electric power source device to said at least one of said brake control apparatus and said brake, in response to an operation of said brake operating member,
   wherein said switching device includes a plurality of switches which are connected in series with each other and which are turned on in response to the operation of said brake operating member that is common to said plurality of switches,
   wherein said brake control apparatus includes a main control device which determines a physical quantity relating to a desired value of a braking force to be produced by said brake, on the basis of at least one of an operation stroke of said brake operating member and an operation force acting on said brake operating member,
   and wherein said switching device including said plurality of switches is disposed between said electric power source and said main control device.

43. An electrically controlled braking system including an electrically controlled brake for braking a wheel of an automotive vehicle, an electric power source device, a brake operating member, and a brake control apparatus for controlling an electric energy to be supplied from said electric power source device to said brake, for thereby controlling an operation of said brake, when said brake operating member is operated, said braking system comprising:
   a switching device disposed between said electric power source device, and at least one of said brake control apparatus and said brake, said switching device being turned on for connecting said electric power source device to said at least one of said brake control apparatus and said brake, in response to an operation of said brake operating member,
   wherein said switching device includes a plurality of switches which are connected in series with each other and which are turned on in response to the operation of said brake operating member that is common to said plurality of switches,
   and wherein said brake operating member is a brake pedal.

* * * * *